US010893273B2

(12) United States Patent
Gamei et al.

(10) Patent No.: US 10,893,273 B2
(45) Date of Patent: Jan. 12, 2021

(54) DATA ENCODING AND DECODING

(71) Applicant: SONY CORPORATION, Tokyo (JP)

(72) Inventors: James Alexander Gamei, Kingston-Upon-Thames (GB); Karl James Sharman, East Ilsley (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/277,283

(22) Filed: Feb. 15, 2019

(65) Prior Publication Data

US 2019/0253714 A1    Aug. 15, 2019

Related U.S. Application Data

(63) Continuation of application No. 15/034,070, filed as application No. PCT/GB2014/053326 on Nov. 7, 2014, now Pat. No. 10,237,556.

(30) Foreign Application Priority Data

Dec. 23, 2013  (GB) .................................... 1322947.1
Mar. 5, 2014   (GB) .................................... 1403854.1

(51) Int. Cl.
*H04N 19/13*       (2014.01)
*H04N 19/176*      (2014.01)
(Continued)

(52) U.S. Cl.
CPC ............. *H04N 19/13* (2014.11); *H04N 19/14* (2014.11); *H04N 19/176* (2014.11); *H04N 19/91* (2014.11)

(58) Field of Classification Search
CPC ............ H04N 7/26; H04N 7/12; H04N 19/13; H04N 19/176; H04N 19/91; H04N 19/14;
(Continued)

(56) References Cited

U.S. PATENT DOCUMENTS 5,455,577 A  * 10/1995  Slivka ..................... G06T 9/005
                                                          341/51
7,660,355 B2 *  2/2010  Winger ............... H03M 7/4006
                                                        375/240.23
(Continued)

FOREIGN PATENT DOCUMENTS

EP        2 637 407 A1     9/2013

OTHER PUBLICATIONS

Office Action dated Apr. 4, 2019 in corresponding Japanese Patent Application No. 2016-542255 (English Translation only), 4 pages.
(Continued)

*Primary Examiner* — James M Pontius
(74) *Attorney, Agent, or Firm* — Oblon, McClelland, Maier & Neustadt, L.L.P.

(57) ABSTRACT

A data encoding method includes encoding an array of data values as data sets and escape codes for values not encoded by the data sets, an escape code including a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

17 Claims, 11 Drawing Sheets

(51) Int. Cl.
*H04N 19/91* (2014.01)
*H04N 19/14* (2014.01)

(58) Field of Classification Search
CPC ... H04N 19/70; H03M 7/4075; H03M 7/4037
USPC .................................................. 375/240.23
See application file for complete search history.

(56) References Cited

U.S. PATENT DOCUMENTS

| | | | | |
|---|---|---|---|---|
| 8,718,146 | B2* | 5/2014 | Kim | H04N 19/176 |
| | | | | 341/107 |
| 9,584,802 | B2* | 2/2017 | Sze | H04N 19/70 |
| 9,894,385 | B2* | 2/2018 | Heo | H04N 19/44 |
| 10,382,759 | B2* | 8/2019 | Hsiang | H04N 19/91 |
| 10,440,369 | B2* | 10/2019 | Young | H04N 19/45 |
| 10,484,695 | B2* | 11/2019 | Young | H04N 19/13 |
| 2004/0111439 | A1* | 6/2004 | Richardson | G06F 16/90344 |
| 2006/0088221 | A1* | 4/2006 | Henry | H04N 19/70 |
| | | | | 382/232 |
| 2006/0198322 | A1* | 9/2006 | Hares | H04L 45/04 |
| | | | | 370/254 |
| 2007/0069023 | A1* | 3/2007 | Jones | G06K 9/6203 |
| | | | | 235/454 |
| 2007/0109160 | A1* | 5/2007 | Pisarevsky | H03M 7/42 |
| | | | | 341/67 |
| 2007/0171985 | A1* | 7/2007 | Kim | H04N 19/61 |
| | | | | 375/240.26 |
| 2013/0114738 | A1* | 5/2013 | Chien | H04N 19/463 |
| | | | | 375/240.24 |
| 2013/0128942 | A1* | 5/2013 | Sikri | H04L 25/03012 |
| | | | | 375/229 |
| 2013/0129238 | A1* | 5/2013 | Sasai | G06T 9/00 |
| | | | | 382/233 |
| 2013/0229292 | A1 | 9/2013 | Kim et al. | |
| 2013/0272389 | A1* | 10/2013 | Sze | H04N 19/91 |
| | | | | 375/240.03 |
| 2013/0336386 | A1* | 12/2013 | Chong | H04N 19/182 |
| | | | | 375/240.02 |
| 2014/0177707 | A1 | 6/2014 | George | |
| 2015/0264362 | A1* | 9/2015 | Joshi | H04N 19/70 |
| | | | | 375/240.18 |
| 2017/0188026 | A1* | 6/2017 | Wu | H04N 19/13 |
| 2017/0318314 | A1* | 11/2017 | Lu | H04N 19/13 |
| 2018/0084284 | A1* | 3/2018 | Rosewarne | H04N 19/91 |

OTHER PUBLICATIONS

Seung-Hwan Kim et al., "Non-RCE2: Rice Parameter Initialization for Higher Bit Depth Coding", Joint Collaborative Team on Video Coding (JCT-VC) of ITU-T SG 16 WP 3 and ISO/IEC JTC 1/SC 29/WG 11, 15th Meeting: Geneva, CH, Oct. 2013, JCTVC-O0327, pp. 1-3 and cover page.

Sunil Lee et al., "Non-RCE2 and AHG18: Increase in the Maximum Value of Rice Parameter for High Bit-Depth Support", Joint Collaborative Team on Video Coding (JCT-VC) of ITU-T SG 16 WP 3 and ISO/IEC JTC 1/SC 29/WG 11, 15th Meeting: Geneva, CH, Oct. 2013, JCTVC-O0129, pp. 1-5 and cover page.

International Search Report dated Jan. 20, 2015, in PCT/GB2014/053326 filed Nov. 7, 2014.

Budagavi, M., et al., "coeff_abs_level_remaining maximum codeword length reduction", Document: JCTVC-J0142, Joint Collaborative Team on Video Coding (JCT-VC) of ITU-T SG 16 WP 3 and ISO/IEC JTC 1/SC 29/WG 11; (Jul. 11-20, 2012); 9 pages.

Sharman, K., et al., "AHG18: Worst-Case Escape Code Length Mitigation", Document: JCTVC-P0061, Joint Collaborative Team on Video Coding (JCT-VC) of ITU-T SG 16 WP 3 and ISO/IEC JTC 1/SC 29/WG 11, (Jan. 9-17, 2014), 5 pages.

Sharman, K., et al., "AHG18: Worst-case Escape Code Length Mitigation", Document: JCTVC-Q0073, Joint Collaborative Team on Video Coding (JCT-VC) of ITU-T SG 16 WP 3 and ISO/IEC JTC 1/SC 29/WG 11, (Mar. 27-Apr. 4, 2014), 6 pages.

* cited by examiner

DATA ENCODING AND DECODING

CROSS REFERENCE TO RELATED APPLICATIONS

The present application is a continuation of U.S. application Ser. No. 15/034,070, filed May 3, 2016 which is a National Stage Entry of Application No. PCT/GB2014/053326, filed Nov. 7, 2014, and claims the benefit of the earlier filing date of GB1403854.1 and GB 1322947.1 filed in the United Kingdom Intellectual Property Office on 5 Mar. 2014 and 23 Dec. 2013 respectively, the entire contents of which applications are incorporated herein by reference.

FIELD OF THE INVENTION

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

Entropy, in the present context, can be considered as representing the information content of a data symbol or series of symbols. The aim of entropy encoding is to encode a series of data symbols in a lossless manner using (ideally) the smallest number of encoded data bits which are necessary to represent the information content of that series of data symbols. In practice, entropy encoding is used to encode the quantised coefficients such that the encoded data is smaller (in terms of its number of bits) than the data size of the original quantised coefficients. A more efficient entropy encoding process gives a smaller output data size for the same input data size.

One technique for entropy encoding video data is the so-called CABAC (context adaptive binary arithmetic coding) technique.

SUMMARY

This disclosure provides a data decoding apparatus comprising: a decoder configured to decode input encoded data values into decoded data values having a bit depth, the input encoded data values being encoded as data sets and escape codes for values not encoded by the data sets, an escape code comprising a prefix portion having a prefix length capped at a maximum prefix length dependent upon the bit depth of the data values and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein.

DESCRIPTION OF THE EMBODIMENTS

Figure 1:
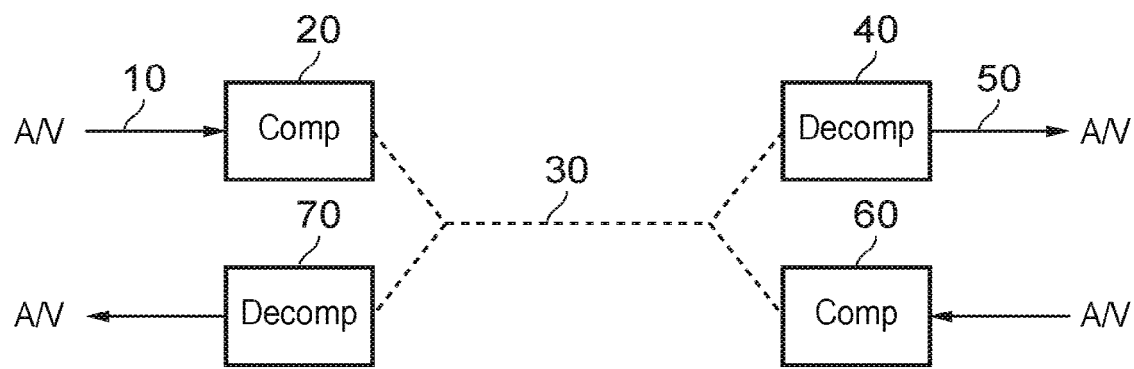
FIG. 1 schematically illustrates an audio/video (A/V) data transmission and reception system using video data compression and decompression.

Referring now to the drawings, FIGS. 1-4 are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
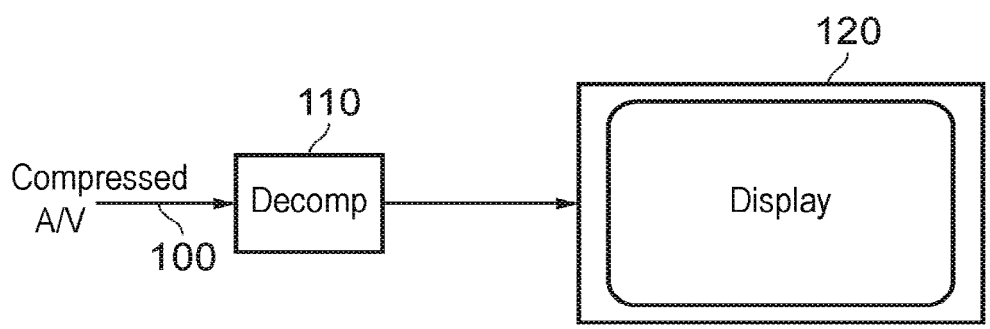
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
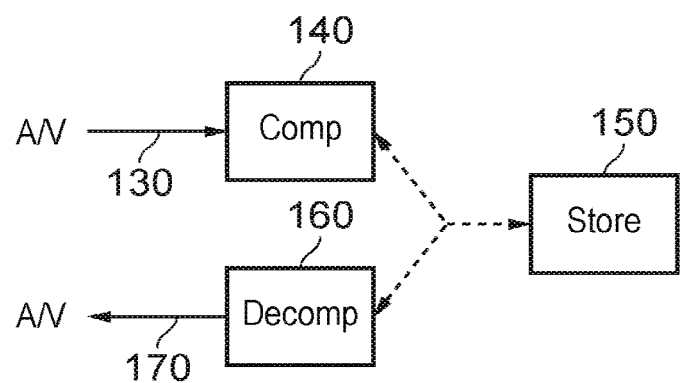
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments.

Figure 4:
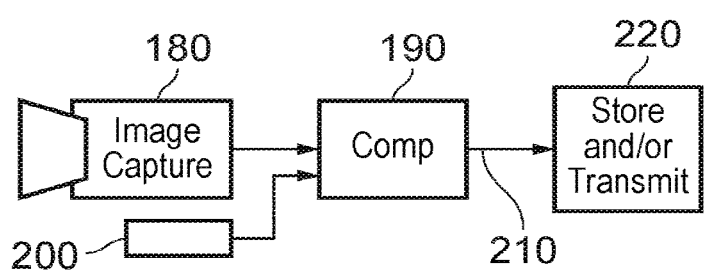
FIG. 4 schematically illustrates a video camera using video data compression.

FIG. 4 schematically illustrates a video camera using video data compression. In FIG. 4, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 5:
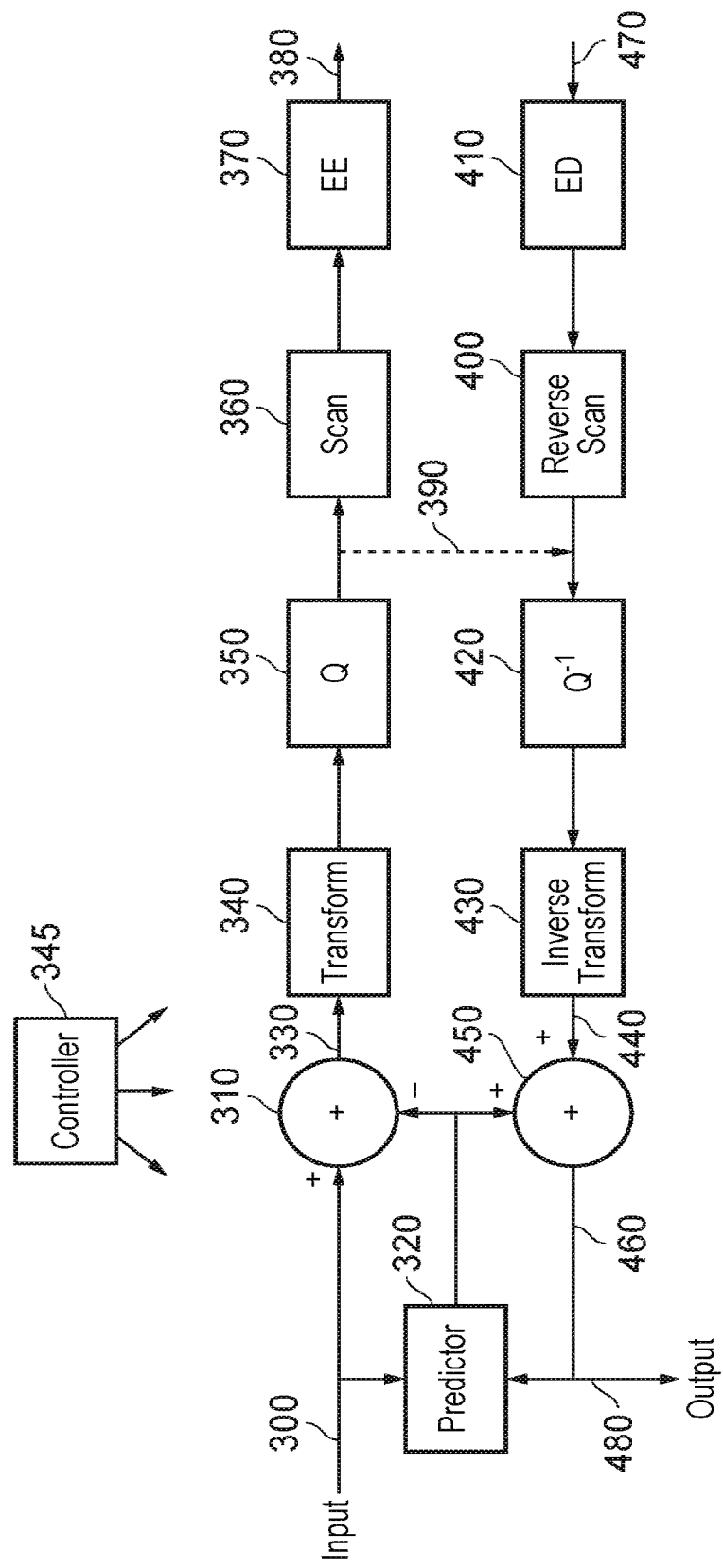
FIG. 5 provides a schematic overview of a video data compression and decompression apparatus.

FIG. 5 provides a schematic overview of a video data compression and decompression apparatus which operates under the control of a controller 345.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below, in particular relating to the selection of different blocks of data to which the DCT operation is applied. These will be discussed with reference to FIGS. 7-12 below.

Note that in some embodiments, a discrete sine transform (DST) is used instead of a DCT. In other embodiments, no transform might be used. This can be done selectively, so that the transform stage is, in effect, bypassed, for example under the control of a "transform skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process, to be described below, work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. Techniques for selecting a scanning order will be described below. One example scanning order which can tend to give useful results is a so-called zigzag scanning order.

The scanned coefficients are then passed to an entropy encoder (EE) 370. Again, various types of entropy encoding may be used. Two examples which will be described below are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. The CABAC technique will be discussed with reference to FIG. 17 below.

Note that the scanning process and the entropy encoding process are shown as separate processes, but in fact can be combined or treated together. That is to say, the reading of data into the entropy encoder can take place in the scan order. Corresponding considerations apply to the respective inverse processes to be described below.

The output of the entropy encoder 370, along with additional data (mentioned above and/or discussed below), for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process (to be described below) a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal will be discussed separately below.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320, as will be described below.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Although FIG. 5 has been described in the context of an encoder, it will be appreciated that the return decoding path (400, 410, 420, 430, 450, 320, all operating under the control of the controller 345) form an example of a decoder. The operations described above and in the discussion below provide examples of method steps relating (as applicable) to encoding and decoding operations.

Figure 6:
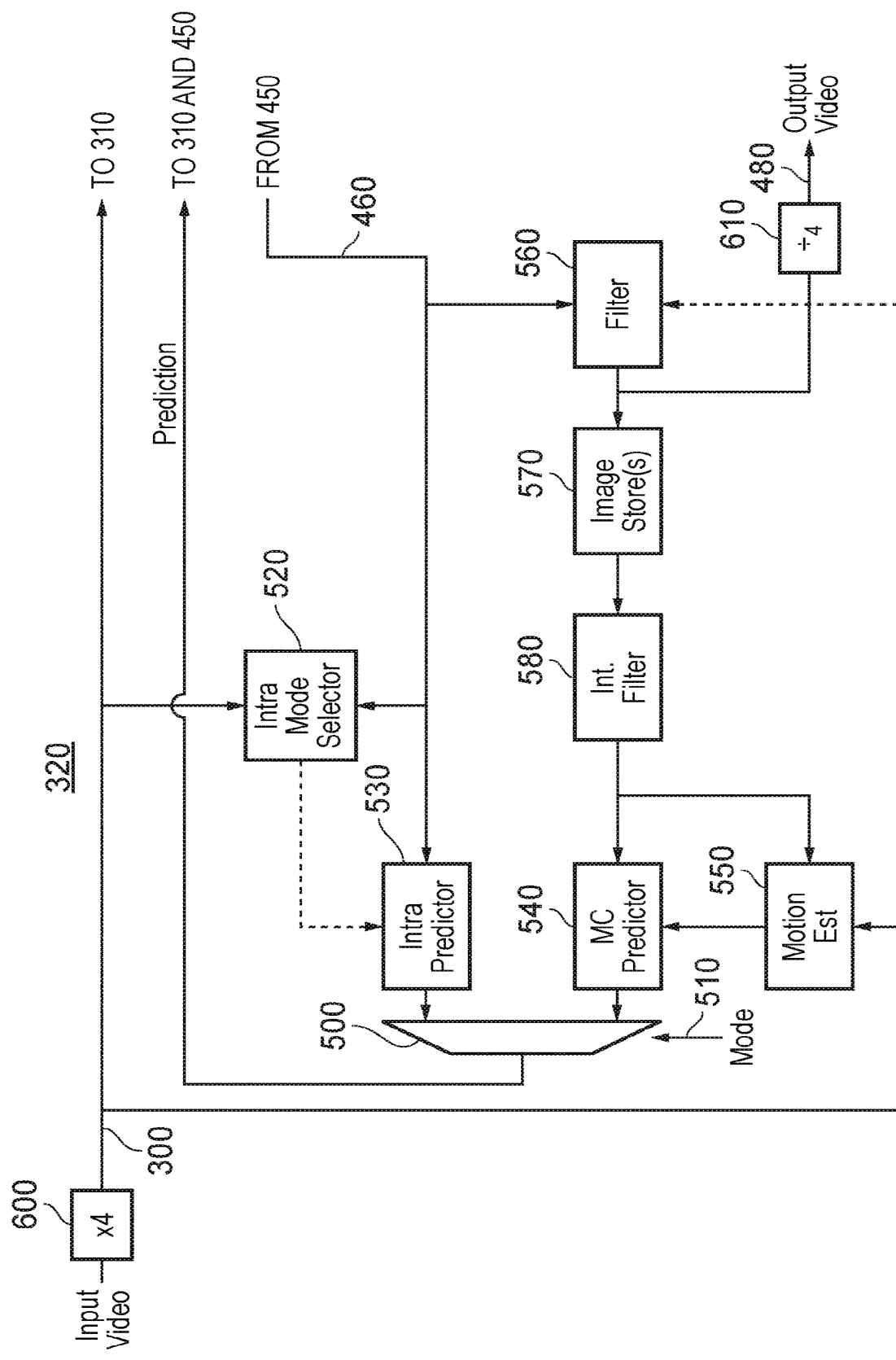
FIG. 6 schematically illustrates the generation of predicted images.
Figure 7:
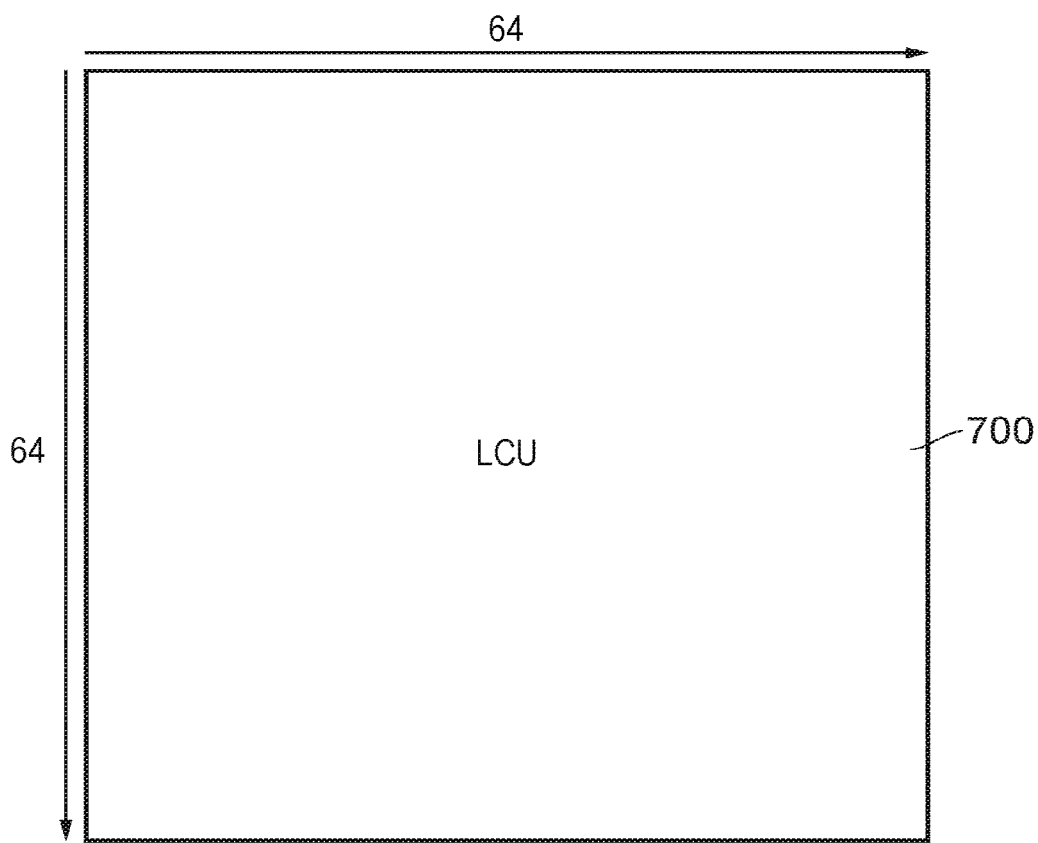
FIG. 7 schematically illustrates a largest coding unit (LCU)

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output datastream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
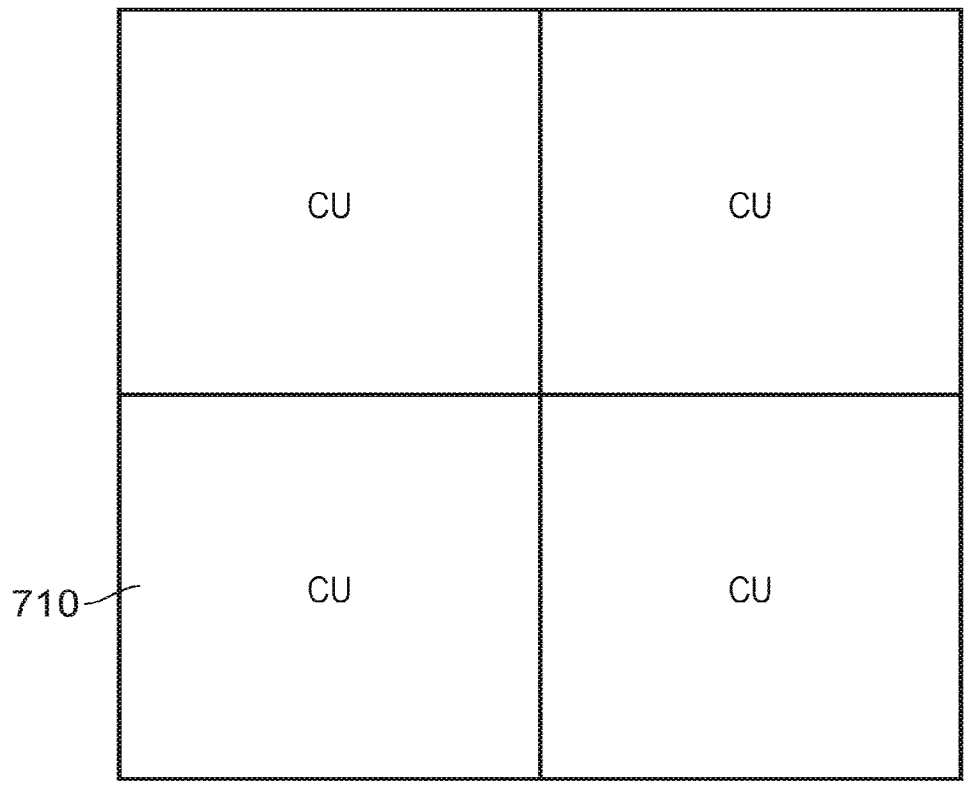
FIG. 8 schematically illustrates a set of four coding units (CU)
Figure 9:
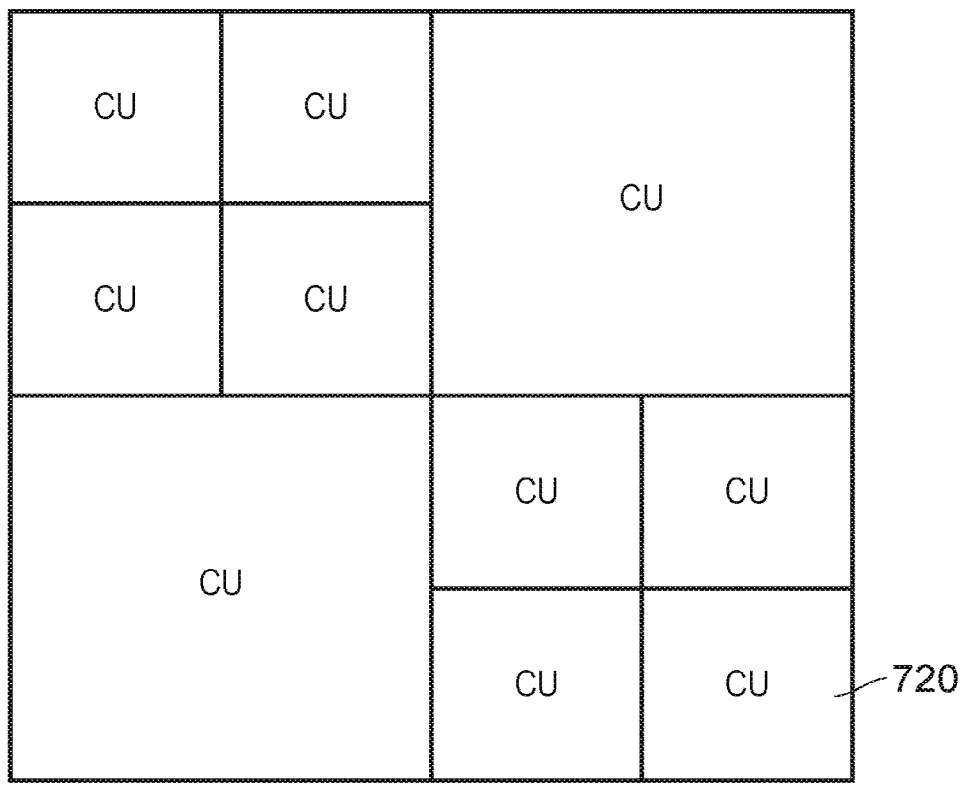
FIGS. 9 and 10 schematically illustrate the coding units of FIG. 8 sub-divided into smaller coding units.
Figure 10:
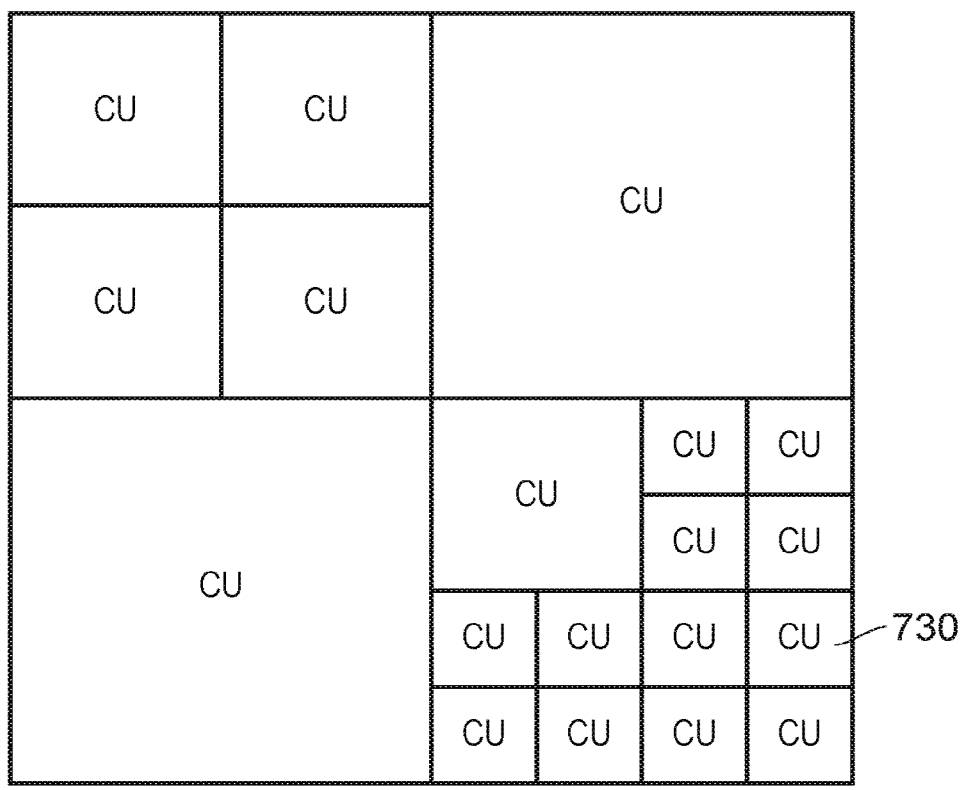

The LCU may be subdivided into so-called coding units (CU). Coding units are always square and have a size between 8×8 samples and the full size of the LCU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the LCU or as small as 8×8 samples. Encoding of the output video data takes place on the basis of the coding unit structure.

Figure 11:
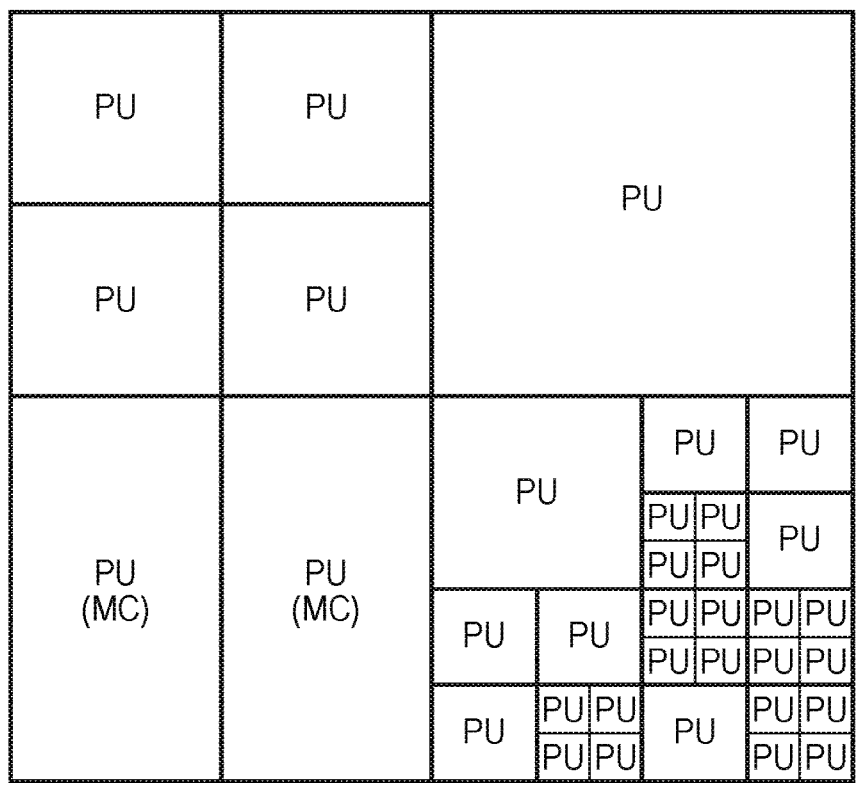
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
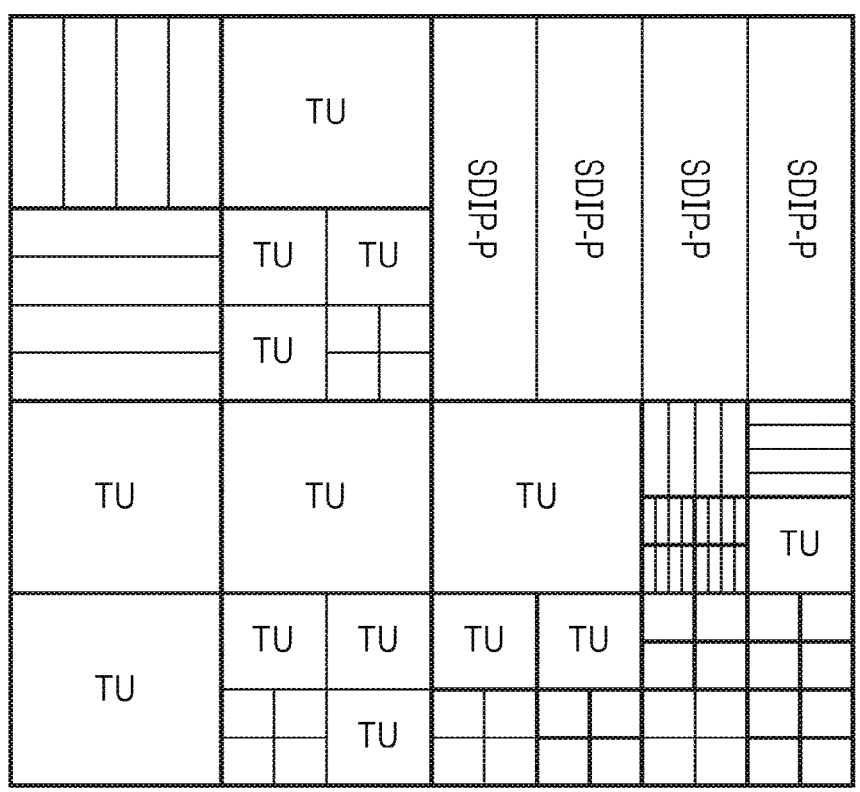
FIG. 12 schematically illustrates an array of transform units (TU)

FIG. 12 schematically illustrates an array of transform units (TU). A transform unit is a basic unit of the transform and quantisation process. Transform units are always square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

Figure 13:
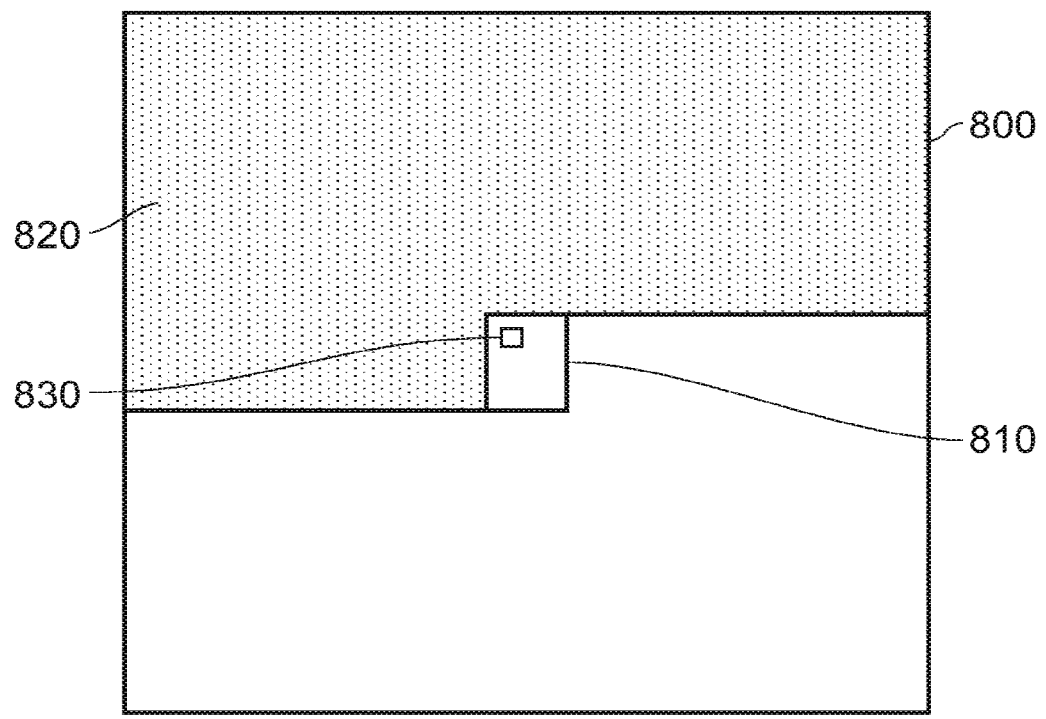
FIG. 13 schematically illustrates a partially-encoded image.

The intra-prediction process will now be discussed. In general terms, intra-prediction involves generating a prediction of a current block (a prediction unit) of samples from previously-encoded and decoded samples in the same image. FIG. 13 schematically illustrates a partially encoded image 800. Here, the image is being encoded from top-left to bottom-right on an LCU basis. An example LCU encoded partway through the handling of the whole image is shown as a block 810. A shaded region 820 above and to the left of the block 810 has already been encoded. The intra-image prediction of the contents of the block 810 can make use of any of the shaded area 820 but cannot make use of the unshaded area below that.

The block 810 represents an LCU; as discussed above, for the purposes of intra-image prediction processing, this may be subdivided into a set of smaller prediction units. An example of a prediction unit 830 is shown within the LCU 810.

The intra-image prediction takes into account samples above and/or to the left of the current LCU 810. Source samples, from which the required samples are predicted, may be located at different positions or directions relative to a current prediction unit within the LCU 810. To decide which direction is appropriate for a current prediction unit, the results of a trial prediction based upon each candidate direction are compared in order to see which candidate direction gives an outcome which is closest to the corresponding block of the input image. The candidate direction giving the closest outcome is selected as the prediction direction for that prediction unit.

The picture may also be encoded on a "slice" basis. In one example, a slice is a horizontally adjacent group of LCUs. But in more general terms, the entire residual image could form a slice, or a slice could be a single LCU, or a slice could be a row of LCUs, and so on. Slices can give some resilience to errors as they are encoded as independent units. The encoder and decoder states are completely reset at a slice boundary. For example, intra-prediction is not carried out across slice boundaries; slice boundaries are treated as image boundaries for this purpose.

Figure 14:
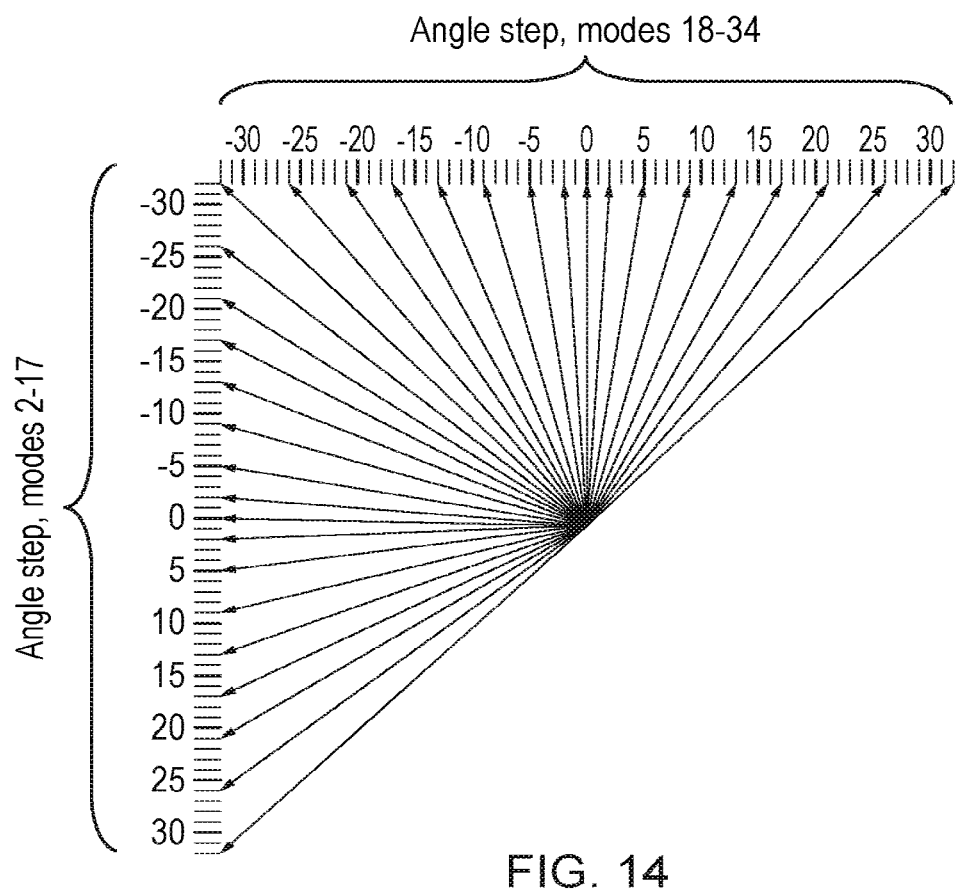
FIG. 14 schematically illustrates a set of possible prediction directions.
Figure 15:
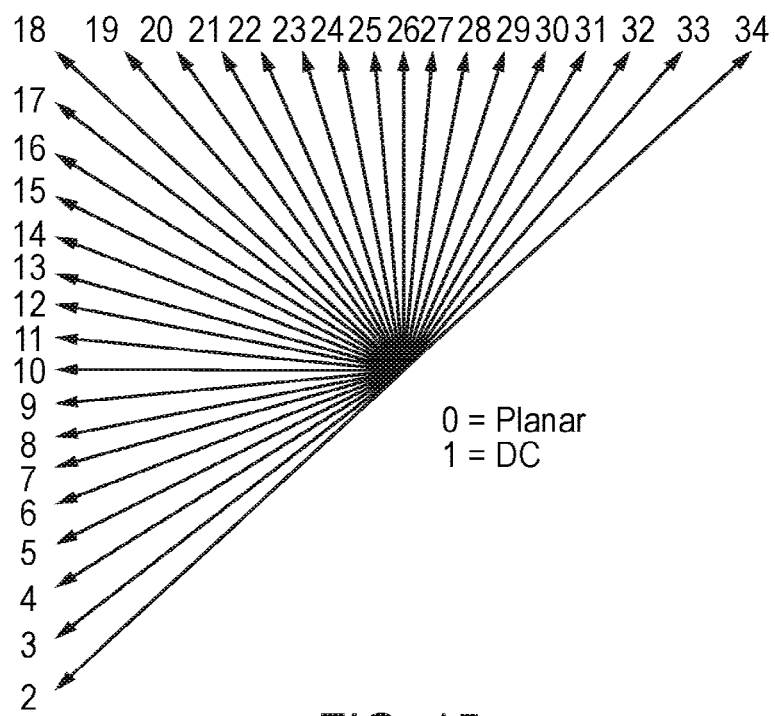
FIG. 15 schematically illustrates a set of prediction modes.

FIG. 14 schematically illustrates a set of possible (candidate) prediction directions. The full set of 34 candidate directions is available to a prediction unit of 8×8, 16×16 or 32×32 samples. The special cases of prediction unit sizes of 4×4 and 64×64 samples have a reduced set of candidate directions available to them (17 candidate directions and 5 candidate directions respectively). The directions are determined by horizontal and vertical displacement relative to a current block position, but are encoded as prediction "modes", a set of which is shown in FIG. 15. Note that the so-called DC mode represents a simple arithmetic mean of the surrounding upper and left-hand samples.

Figure 16:
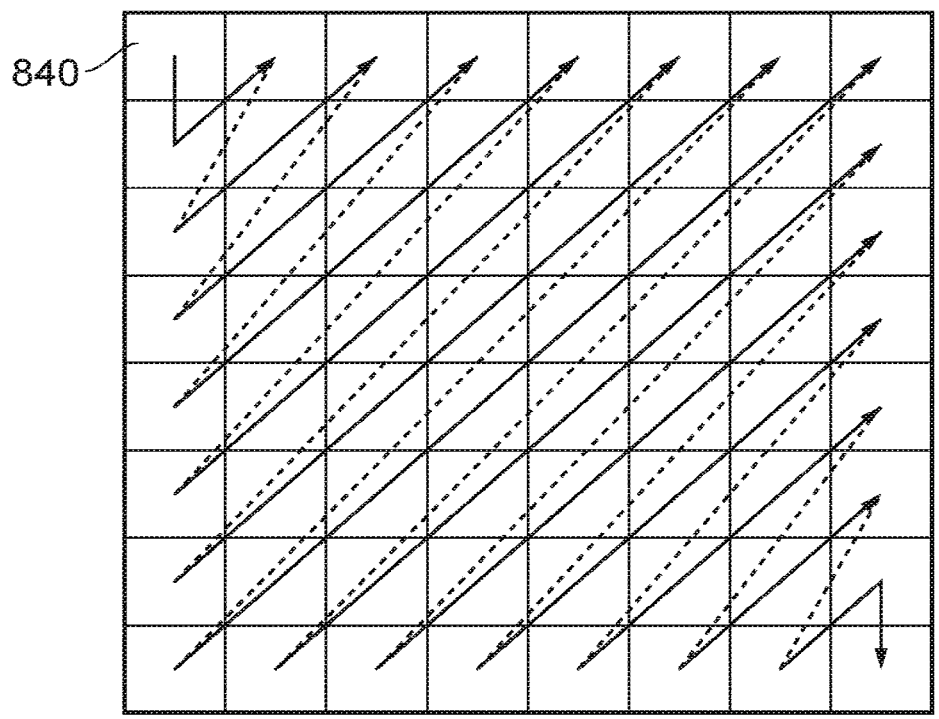
FIG. 16 schematically illustrates a zigzag scan.

FIG. 16 schematically illustrates a zigzag scan, being a scan pattern which may be applied by the scan unit 360. In FIG. 16, the pattern is shown for an example block of 8×8 transform coefficients, with the DC coefficient being positioned at the top left position 840 of the block, and increasing horizontal and vertical spatial frequencies being represented by coefficients at increasing distances downwards and to the right of the top-left position 840.

Note that in some embodiments, the coefficients may be scanned in a reverse order (bottom right to top left using the ordering notation of FIG. 16). Also it should be noted that in some embodiments, the scan may pass from left to right across a few (for example between one and three) uppermost horizontal rows, before carrying out a zig-zag of the remaining coefficients.

Figure 17:
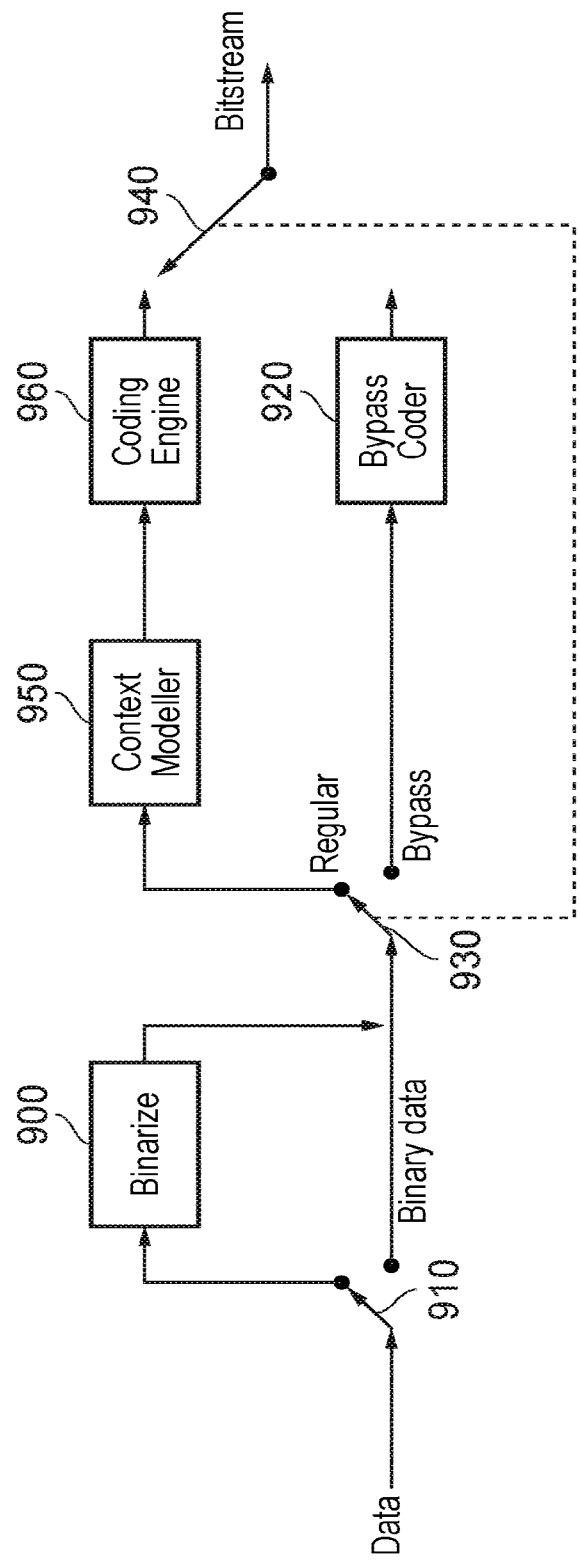
FIG. 17 schematically illustrates a CABAC entropy encoder.

FIG. 17 schematically illustrates the operation of a CABAC entropy encoder.

In context adaptive encoding of this nature and according to embodiments, a bit of data may be encoded with respect to a probability model, or context, representing an expectation or prediction of how likely it is that the data bit will be a one or a zero. To do this, an input data bit is assigned a code value within a selected one of two (or more generally, a plurality of) complementary sub-ranges of a range of code values, with the respective sizes of the sub-ranges (in embodiments, the respective proportions of the sub-ranges relative to the set of code values) being defined by the context (which in turn is defined by a context variable associated with or otherwise relevant to that input value). A next step is to modify the overall range, which is to say, the set of code values, (for use in respect of a next input data bit or value) in response to the assigned code value and the current size of the selected sub-range. If the modified range is then smaller than a threshold representing a predetermined minimum size (for example, one half of an original range size) then it is increased in size, for example by doubling (shifting left) the modified range, which doubling process can be carried out successively (more than once) if required, until the range has at least the predetermined minimum size. At this point, an output encoded data bit is generated to indicate that a (or each, if more than one) doubling or size-increasing operation took place. A further step is to modify the context (that is, in embodiments, to modify the context variable) for use with or in respect of the next input data bit or value (or, in some embodiments, in respect of a next group of data bits or values to be encoded). This may be carried out by using the current context and the identity of the current "most probable symbol" (either one or zero, whichever is indicated by the context to currently have a greater than 0.5 probability) as an index into a look-up table of new context values, or as inputs to an appropriate mathematical formula from which a new context variable may be derived. The modification of the context variable may, in embodiments, increase the proportion of the set of code values in the sub-range which was selected for the current data value.

The CABAC encoder operates in respect of binary data, that is to say, data represented by only the two symbols 0 and 1. The encoder makes use of a so-called context modelling process which selects a "context" or probability model for subsequent data on the basis of previously encoded data. The selection of the context is carried out in a deterministic way so that the same determination, on the basis of previously decoded data, can be performed at the decoder without the need for further data (specifying the context) to be added to the encoded datastream passed to the decoder.

Referring to FIG. 17, input data to be encoded may be passed to a binary converter 900 if it is not already in a binary form; if the data is already in binary form, the converter 900 is bypassed (by a schematic switch 910). In the present embodiments, conversion to a binary form is actually carried out by expressing the quantised transform coefficient data as a series of binary "maps", which will be described further below.

The binary data may then be handled by one of two processing paths, a "regular" and a "bypass" path (which are shown schematically as separate paths but which, in embodiments discussed below, could in fact be implemented by the same processing stages, just using slightly different parameters). The bypass path employs a so-called bypass coder 920 which does not necessarily make use of context modelling in the same form as the regular path. In some examples of CABAC coding, this bypass path can be selected if there is a need for particularly rapid processing of a batch of data, but in the present embodiments two features of so-called "bypass" data are noted: firstly, the bypass data is handled by the CABAC encoder (950, 960), just using a fixed context model representing a 50% probability; and secondly, the bypass data relates to certain categories of data, one particular example being coefficient sign data. Otherwise, the regular path is selected by schematic switches 930, 940. This involves the data being processed by a context modeller 950 followed by a coding engine 960.

The entropy encoder shown in FIG. 17 encodes a block of data (that is, for example, data corresponding to a block of coefficients relating to a block of the residual image) as a single value if the block is formed entirely of zero-valued data. For each block that does not fall into this category, that is to say a block that contains at least some non-zero data, a "significance map" is prepared. The significance map indicates whether, for each position in a block of data to be encoded, the corresponding coefficient in the block is non-zero (and so is an example of a significance map indicative of positions, relative to an array of the data values, of most-significant data portions which are non-zero.) The significance map may comprise a data flag indicative of the position, according to a predetermined ordering of the array of data values, of the last of the most-significant data portions having a non-zero value The significance map data, being in binary form, is itself CABAC encoded. The use of the significance map assists with compression because no data needs to be encoded for a coefficient with a magnitude that the significance map indicates to be zero. Also, the significance map can include a special code to indicate the final non-zero coefficient in the block, so that all of the final high frequency/trailing zero coefficients can be omitted from the encoding. The significance map is followed, in the encoded bitstream, by data defining the values of the non-zero coefficients specified by the significance map.

Further levels of map data are also prepared and are CABAC encoded. An example is a map which defines, as a binary value (1=yes, 0=no) whether the coefficient data at a map position which the significance map has indicated to be "non-zero" actually has the value of "one". Another map specifies whether the coefficient data at a map position which the significance map has indicated to be "non-zero" actually has the value of "two". A further map indicates, for those map positions where the significance map has indicated that the coefficient data is "non-zero", whether the data has a value of "greater than two". Another map indicates, again for data identified as "non-zero", the sign of the data value (using a predetermined binary notation such as 1 for +, 0 for −, or of course the other way around).

In embodiments, the significance map and other maps are generated from the quantised transform coefficients, for example by the scan unit 360, and is subjected to a zigzag scanning process (or a scanning process selected from zigzag, horizontal raster and vertical raster scanning according to the intra-prediction mode) before being subjected to CABAC encoding.

In some embodiments, the HEVC CABAC entropy coder codes syntax elements using the following processes:

The location of the last significant coefficient (in scan order) in the TU is coded.

For each 4×4 coefficient group (groups are processed in reverse scan order), a significant-coefficient-group flag is coded, indicating whether or not the group contains non-zero coefficients. This is not required for the group containing the last significant coefficient and is assumed to be 1 for the top-left group (containing the DC coefficient). If the flag is 1, then the following syntax elements pertaining to the group are coded immediately following it:

Significance Map:

For each coefficient in the group, a flag is coded indicating whether or not the coefficient is significant (has a non-zero value). No flag is necessary for the coefficient indicated by the last-significant position.

Greater-than-One Map:

For up to eight coefficients with significance map value 1 (counted backwards from the end of the group), this indicates whether the magnitude is greater than 1.

Greater-than-Two Flag:

For up to one coefficient with greater-than-one map value 1 (the one nearest the end of the group), this indicates whether the magnitude is greater than 2.

Sign Bits:

For all non-zero coefficients, sign bits are coded as equiprobable CABAC bins, with the last sign bit (in reverse scan order) possibly being instead inferred from parity when sign bit hiding is used.

Escape Codes:

For any coefficient whose magnitude was not completely described by an earlier syntax element, the remainder is coded as an escape code.

In general terms, CABAC encoding involves predicting a context, or a probability model, for a next bit to be encoded, based upon other previously encoded data. If the next bit is the same as the bit identified as "most likely" by the probability model, then the encoding of the information that "the next bit agrees with the probability model" can be encoded with great efficiency. It is less efficient to encode that "the next bit does not agree with the probability model", so the derivation of the context data is important to good operation of the encoder. The term "adaptive" means that the context or probability models are adapted, or varied during encoding, in an attempt to provide a good match to the (as yet uncoded) next data.

Using a simple analogy, in the written English language, the letter "U" is relatively uncommon. But in a letter position immediately after the letter "Q", it is very common indeed. So, a probability model might set the probability of a "U" as a very low value, but if the current letter is a "Q", the probability model for a "U" as the next letter could be set to a very high probability value.

CABAC encoding is used, in the present arrangements, for at least the significance map and the maps indicating whether the non-zero values are one or two, though each of these syntax elements may not be coded for every coefficient. Bypass processing—which in these embodiments is identical to CABAC encoding but for the fact that the probability model is fixed at an equal (0.5:0.5) probability distribution of 1s and 0s, is used for at least the sign data and the parts of the coefficient magnitude that have not been described by an earlier syntax element. For those data positions identified as having parts of their coefficient magnitude not fully described, a separate so-called escape data encoding can be used to encode the actual remaining value of the data, where the actual magnitude value is the remaining magnitude value plus an offset derived from the respective coded syntax elements. This may include a Golomb-Rice Encoding Technique.

The CABAC context modelling and encoding process is described in more detail in WD4: Working Draft 4 of High-Efficiency Video Coding, JCTVC-F803_d5, Draft ISO/IEC 23008-HEVC; 201x(E) 2011-10-28.

Further techniques relating to embodiments of escape bit encoding or related techniques will be discussed with reference to FIG. 18.

First, however, techniques used to encode escape codes will be discussed.

In the current HEVC standard (at the priority date of the present application), escape codes are coded using two mechanisms:

1/A Golomb-Rice code with a maximum prefix length of 2.

2/If the coded value could not be completely described by the Golomb-Rice code, an "escape-escape" code is coded using exponential-Golomb-order-k.

So-called Golomb-Rice coding encodes a value, v, as a unary encoded prefix (a variable number of 1s followed by a 0, or vice versa) followed by k (otherwise referred to as rParam) bits of suffix.

The coding space is divided into intervals, the size of which are determined by the Rice parameter rParam as:

interval size=1<<rParam

As normal, the notation "<<n" signifies a left shift by a number of bit positions equal to the value n. A similar notation >>n signifies a right shift by n bit positions. So, for example, when rParam is 0, the coding interval size is 1. When rParam is 3, the interval size is 8, and so on.

The value of rParam is maintained separately by the encoder and decoder and modified under predetermined conditions.

The prefix is coded using unary coding to indicate which coding interval the final value falls within.

For example, prefix value=2, rParam=2, interval size=4 and the value falls within the range 8-11 inclusive. This can be considered the "coarse" part of the value.

A suffix is coded using binary coding (suffix length is equal to rParam). The suffix value indicates where in the specified interval the final value lies.

For example, prefix value=2, rParam=2, suffix value=3; this indicates that the final value lies within the interval 8-11. A suffix value of 0 would indicate a final value of 8; a suffix value of 3 (as in the present example) indicates a final value of 11.

The suffix can therefore be considered the "fine" part of the value.

Let prefix_length be the total number of 1s in the unary encoded prefix. Let K be the value of the least significant rParam bits.

final value=(prefix_length<<rParam)+K

As mentioned above, in the current HEVC standard (at the priority date of the present application), a limit (of 2) is imposed on the maximum prefix length for Golomb-Rice coding (hence there are no more than 3 intervals). If a longer prefix is sent, 3 is subtracted from its value (a prefix's value is equal to its length) and the prefix is treated as an exponential-Golomb-order-k prefix instead (with rParam serving as the value of k). This exponential-Golomb-order-k code may be considered to be an escape from the normal escape-coding mechanism—an "escape-escape" code.

It would be understood that the Golomb Rice prefix with maximum length of 2 followed by an exponential Golomb order -k is also equivalent to a Golomb Rice prefix with maximum length of 3 followed by a Golomb-order-k+1 exponent.

In addition, the final value is also modified by adding (in the decoder) or subtracting (in the encoder) the minimum value that could not be coded using Golomb-Rice coding since the final value is known to be at least that large since escape-escape coding is being used.

Exponential Golomb order-k codes will now be discussed. In such codes, a number to be encoded is split into a variable length unary-encoded prefix and a variable length suffix. The number of suffix bits=prefix_length+k. Here, prefix_length is once again the number of 1s in the unary code.

As in Golomb-Rice coding, the coding space is divided into intervals. However, the intervals are not equal-sized; instead they increase in size exponentially, for example (interval 0=0, interval 1=1-2, interval 2=3-6) and so on.

A prefix is coded using unary coding to indicate which coding interval the final value falls within.

A suffix is coded using binary coding, though here the suffix length is equal to the prefix length. The suffix value indicates where in the specified interval the final value lies.

A number of extra bits equal to k is coded using binary coding; these bits serve as additional LSBs of the final value.

The total number of bits in the code=prefix_length+1+prefix_length+k.

Let K be the value of the last k bits.

When prefix_length is 0, v will be equal to K.

When prefix_length is 1, v will be between (1<<k)+K and (3<<k)+K (exclusive)

When prefix_length is 2, v will be between (3<<k)+K and (7<<k)+K (exclusive)

When prefix_length is 3, v will be between (7<<k)+K and (15<<k)+K (exclusive)

Therefore v=((2^prefix_length)−1)<<k)+suffix

For example: final binary code=110011.

In this example, rParam=1; prefix length=2 (two 1s before the first 0), coding interval=3-6; suffix=0b01=1, value before k=4=0b100; extra bit=0b1=1, final value=0b1001=9. (The 0b denotes a binary representation).

In HEVC, as mentioned above, both Golomb-Rice and Exponential Golomb codes are used. If prefix_length is less than three, the code is interpreted as a Golomb-Rice code. However, if the prefix_length is greater than or equal to 3, the code is interpreted as an exponential Golomb code of order k, where the rParam value mentioned above serves as the value k.

The prefix (in either system) is an example of a unary code. The suffix is an example of a non-unary code. The two systems are examples of a two-part variable length code.

In this case, the value of prefix_length used to decode the exponential Golomb code is reduced by 3, and the value resulting from the decoding operation is increased by (3<<k), since this is the smallest value that cannot be represented using the Golomb-Rice code.

The value "k" used for the HEVC Escape and Escape-Escape codes varies. For each group of 16 coefficients, the value k starts at 0, and is increased whenever the magnitude of a coefficient value is greater than 3<<k. In response to this situation, k is incremented, to a maximum of 4. Note that the discussion relates to coefficient magnitudes, as a sign bit representing the sign of a coefficient is sent separately. Other schemes for initializing and adjusting k may be also be applied.

Figure 18:
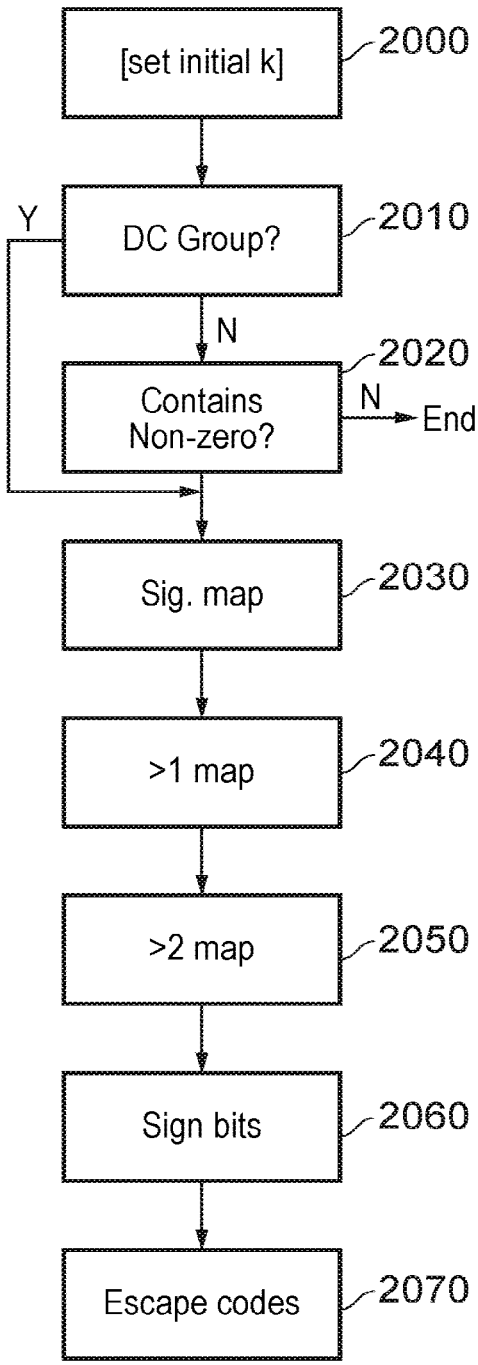
FIG. 18 is a flowchart schematically illustrating a coding technique.

FIG. 18 is a schematic flowchart illustrating a process to generate escape codes as discussed above.

The method is operable with respect to a group of data values comprising (for example) a sequence of frequency transformed image coefficients, or the non-zero constituents of that sequence or the non-zero constituents of that sequence where the magnitude of each data value has been reduced by 1 (in this last case, a significance map may be generated first, so that each coefficient is reduced by 1 before further processing because the significance map accounts for the value of 1).

At a step 2000, an initial value of k is set at the beginning of each group. In a normal HEVC version 1 system, k is initially set to 0, although there may be alternative schemes used for extensions to the HEVC standard. At a step 2010, the CABAC encoder checks whether the current group is the top-left group containing the equivalent of the DC coefficient or the group contains the coefficient marked as the last significant coefficient by an earlier process. If so, control passes to a step 2030. If not, at a step 2020 the CABAC encoder checks whether the current group contains non-zero coefficients. If not, the process ends having coded the respective significance group flag as 0. If so, then control passes to the step 2030, having coded the respective significance group flag as 1. At the step 2030 a significance map is generated for each coefficient in the group (although for the group containing the last significant coefficient, some coefficients do not require a significance map entry, as these can be inferred). At a step 2040, a >1 map is generated which indicates, for up to 8 coefficients with significance map value 1, counted backwards from the end of the group, whether the magnitude is greater than 1. At a step 2050, a >2 map is generated. For up to 1 coefficient with >1 map value of 1 (the one nearest the end of the group), this indicates whether the magnitude is greater than 2. At a step 2060, sign bits are generated for all significant coefficients (although a scheme called sign bit hiding may be used to infer the last sign bit that would have otherwise been coded from the even and odd parity of the coded values in the group) and at a step 1570, escape codes are generated for any coefficient whose magnitude was not completely described by an earlier syntax element (that is to say, data generated in any of the steps 2030-2060). Note that in FIG. 18, in some example implementations of HEVC, not all of the maps need to be generated for each coefficient. For example, within a group of (say) 16 coefficients, there may be one or more coefficients for which some maps are not generated.

These maps are examples of a greater-than-one map indicative of positions, relative to the array of the data values, of most-significant data portions which are greater than 1; and a greater-than-two map indicative of positions, relative to the array of the data values, of most-significant data portions which are greater than 2.

At a step 2070, if an escape code is needed, it is generated based on a current value of k using the techniques just described. In particular, a coefficient which requires the use of an escape code is first handled using the significance map and optionally one or more of the other maps. Note that in the case of a coefficient which needs escape coding, any of the significance, >1 and >2 maps that are used will be flagged as "1". This is because any coefficient which requires escape coding is by definition greater than a value which can be encoded using whichever maps are available in respect of that coefficient.

An escape code is needed if the current data value has not been fully encoded. Here, the term "fully" encoded means that the data value, less the values already encoded (by the maps, or the maps plus the fixed bits, for example) is zero. In other words, a data value is fully encoded by components already generated if the residual amount of that data value, taking those components into account, is zero.

So, assuming that for an example coefficient, a significance map and >1 and >2 maps are available, each of these will be flagged as "significant", ">1" and ">2" in respect of that coefficient.

This means (in this example) that the coefficient must be at least 3.

Therefore, the value of 3 can be subtracted from the coefficient before escape coding, with no loss of information. The value of 3 (or more generally, a variable base_level which indicates the numerical range which is defined by the maps which apply to that coefficient) is reinstated at decoding.

Taking a coefficient value of 15 decimal (1111 binary) as an example, the significance map is "1", the >1 map is "1" and the >2 map is "1". The value base_level is 3. Base_level is subtracted from the coefficient value to give a value of 12 decimal (1100 binary) which is passed for escape coding.

The value k (see above) now defines the number of suffix bits. The suffix bits are taken from the least significant bits of the coefficient value after the subtraction of base_level. If (for example) k=2, then the two least significant bits of the remaining value 1100 are treated as suffix bits, which is to say that the suffix bits in this example are 00. The remaining bits (11 in this example) are handled encoded as a prefix.

So in summary, the processing associated with an escape code involves:

generating one or more maps defining one or more least significant bits of a coefficient so that (if an escape code is required) the coefficient must have a value of at least base_level;

subtracting base_level from the coefficient;

encoding the least significant k bits of the remaining part of the coefficient as suffix bits; and encoding the remaining most significant bits of the remaining part of the coefficient as a prefix.

Embodiments of the present disclosure concern a recognition of the worst-case code length that may occur when coding an escape code for a coefficient.

When using extended precision processing for 16-bit video, the coefficient range in the entropy coder maxTrDynamicRange is 22-bits, hence it can be shown with this scheme that the maximum number of escape-code bits that may be coded for a coefficient is given when rParam is 0 and the coefficient magnitude is at its maximum of $(1<<22)$ as:

The maximum exponential-Golomb coded value =

$(1 << 22)$ (the initial coefficient magnitude) −

1 (deduct 1 because of the value already coded by significance map) − 3 (deduct 3 because it is not a Golomb-Rice code as discussed above) = 4194300

In HEVC exponential-Golomb coding, this value requires a 21-bit suffix (and therefore a 21-bit prefix) as well as a 1-bit separator and 3 extra prefix bits to signal that it is not a Golomb-Rice code. This results in a worst-case total of 46 bits, which may be too heavy a burden on a decoder.

Embodiments of the present disclosure provide one or more alternative schemes to the exponential-Golomb part of escape coding that can reduce the worst-case escape code length to 32, which is the same as the worst-case escape code length in HEVC version 1. Potentially the code length can reduce further, although this becomes a trade-off between code length and coding efficiency. Since a version 2 decoder would have to support version 1, there is no demand for reducing the maximum code length in extended profiles of a version 2 decoder below that of the maximum code length of the version 1 standard.

As discussed above, in the current HEVC standard (at the priority date of the present application), escape codes (any part of a coefficient's magnitude not described by a CABAC-coded syntax element) are coded using a two-part Golomb-Rice/exponential-Golomb method. When coding 16-bit video using extended precision, this method results in a maximum escape code length of 46 bits as derived above, which could be a considerable burden to decode for a single coefficient.

In some embodiments, by modifying the mapping between the prefix and suffix lengths in the exponential-Golomb part of the escape coding scheme, the worst case can be reduced, for example to 32 bits, without significant adverse effect on coding efficiency or processing efficiency. In other embodiments, the Golomb-Rice can also be adjusted, or even removed entirely.

When coding 16-bit video using so-called extended precision, the dynamic range of the transform and quantiser and therefore of coefficients entering the entropy coder (maxTrDynamicRange) is equal to 16+6=22. This results in a maximum coefficient magnitude of $2^{22}$=4194304. When adjusted by subtraction of 1 for the significance map entry and 3 for the Golomb-Rice code (the Rice parameter rParam is 0 in the worst case), the maximum value that can be coded using exponential-Golomb coding is 4194300.

It can be shown that, to code this value using exponential-Golomb in HEVC, a 21-bit suffix (and therefore a 21-bit prefix) is required in addition to a one-bit separator and three extra prefix bits to signal that exponential-Golomb coding is in use. This results in a worst-case total code length of 46.

However, rather than simply map prefix length directly onto suffix length (as a 1:1 mapping), various alternative schemes are provided here.

In some embodiments, the suffix length can be a function (such as an exponential function) of the prefix length. An example of an exponential function is suffixLength= (1<<prefixLength)>>1. This way, for example, only 5 prefix bits have to be sent to signal 16 suffix bits; the separator '0' may also be required, depending on whether unary coding or truncated unary coding with a maximum of 5 is used. This is an example of an arrangement in which the value encoded by the prefix portion is associated with the length of the non-unary coded suffix portion such that the length of the non-unary coded suffix portion is an exponential function of the value encoded by the prefix portion.

In some embodiments, the prefix can itself be an exponential-Golomb code rather than a unary-encoding.

In some embodiments the prefix length can be mapped to the suffix length by use of a table. This method allows the set of interval sizes to be tailored to the data. The table could be predetermined (that is to say, provided beforehand in the encoder and the decoder), or sent in or in association with the encoded data stream (so that the relationship between the length of the prefix portion and the length of the suffix portion is defined by information sent in association with the data to be coded), or derived from previously-coded coefficients or other data, or a combination of these or other techniques (such as selected from a set of predetermined tables using data sent in the stream). In some embodiments the value encoded by the prefix portion and the length of the non-unary coded suffix portion are associated by one or more tables. Some embodiments comprise a step of selecting one of the tables associating the value encoded by the prefix portion and the length of the non-unary coded suffix portion according to one or more of the group consisting of: (i) a data flag associated with the encoded data values; and (ii) a parameter derived from one or more previously encoded data values.

Some other embodiments can operate as follows. When coding 16-bit video using extended precision, the dynamic range of the transform and quantiser and therefore of coefficients entering the entropy coder (maxTrDynamicRange) is equal to 16+6=22. As discussed above, this results in a maximum coefficient magnitude of $2^{22}$=4194304. When adjusted by subtraction of 1 for the significance map entry and 3 for the Golomb-Rice code (the Rice parameter rParam is 0 in the worst case), the maximum value that can be coded using exponential-Golomb coding is 4194300, and a worst-case total code length of 46, as discussed above.

However, rather than simply allow prefix length to extend without limit, an alternative scheme can be used when extended-precision processing is enabled that limits the number of prefix bits required to signal the worst case. The maximum prefix length is given by:

maximumPrefixLength=32−(3+MAX_TR_DYNAMIC_RANGE)

When this prefix length is reached, the corresponding suffix length is then given by:

suffixLength=MAX_TR_DYNAMIC_RANGE−rParam

Further, since the maximum prefix length is known at the start of encoding/decoding, the prefix can be coded using truncated-unary coding—omitting the separator if the maximum prefix length is reached.

The worst case escape code length is hence reduced to:

$$(32 - (3 + \text{MAX\_TR\_DYNAMIC\_RANGE}))(\text{prefix}) +$$
$$(\text{MAX\_TR\_DYNAMIC\_RANGE} - rParam)(\text{suffix}) +$$
$$rParam(\text{fixed bits}) + 3(\text{not-a-Golomb-Rice-code bits}) = 32$$

This allows any escape code to fit into a single 32-bit integer and renders maximum escape code length the same as that in HEVC version 1. Note that a HEVC decoder which supports high bit depth operation (such as the use of 16 bit video) would still in at least some embodiments need to support the use of data encoded using HEVC version 1, so this limit in the number of bits of the escape code to the maximum allowed under HEVC version 1 means that in such arrangements the escape code length is no greater than the maximum already supported.

These embodiments can provide similar advantages to the mapping table arrangement discussed above, but the present examples can achieve the same worst-case code length mitigation and the same coding performance but without the need for a lookup table. However, the general principle of capping the prefix length to a maximum length dependent upon the bit depth of the data values (to be encoded or as decoded) can also be used in conjunction with one or more tables as discussed above, or with the other expressions of the relationship between prefix length and suffix length.

These embodiments therefore provide an example of a technique in which the prefix length is capped at a maximum prefix length value. For example, the maximum prefix length value may be dependent upon a value maxTrDynamicRange, being the dynamic range of the data values for encoding. In some examples, the maximum prefix length is equal to 29-maxTrDynamicRange. In other examples, the maximum prefix length is equal to 28-maxTrDynamicRange.

Note that another way of expressing some of these techniques is that the video data has a bit depth (such as 16 bits, an expression of a number of bits per sample in each channel). This bit depth applies to samples of the original video data (that is, samples for encoding by an encoder), and also applies correspondingly to the decoded samples as decoded by a decoder. The bit depth may be implicit from the data structure as supplied to the encoder or decoder, or may be flagged or otherwise indicated to the encoder or decoder by one or more indicators such as flags or parameters. In some examples, maxTrDynamicRange is set to be equal to the bit depth plus an offset such as an offset of 6 bits (so in a situation where the bit depth is 16 bits, for example, the variable maxTrDynamicRange may be equal to 16+6=22 bits) and the prefix length is therefore capped at a maximum prefix length dependent upon the bit depth of the data values for encoding or the decoded data values, as the case may be. More specifically, in some examples the prefix length is therefore capped at a maximum prefix length dependent upon the bit depth of the data values for encoding or the decoded data values, as the case may be, plus six bits.

Accordingly such arrangements can provide examples of encoding or decoding systems and methods in which the maximum prefix length is equal to a predetermined constant minus a value equal to the dynamic range of the data values for encoding. For example, the predetermined constant may be equal to 29, or the predetermined constant is equal to 28.

A combination of these techniques, and/or techniques to be discussed below, may be used.

The controller 345 can be operable (in the case of either a decoder or an encoder, or in the case of corresponding methods) to detect any parameters on which the prefix length and/or the relationship between prefix length and suffix length depend, and to set or otherwise implement the maximum prefix length and the relationship between prefix length and suffix length.

These schemes are all embodiments of a technique in which a method of operation of a data encoding apparatus comprises the data encoding apparatus encoding an array of data values as data sets and escape codes for values not encoded by the data sets, an escape code comprising a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion. Examples described here provide embodiments of a technique in which the prefix length is capped at a maximum prefix length dependent upon the bit depth of the data values being encoded or the decoded data values.

In terms of a corresponding decoding operation (at a decoder or in the decoding path of the encoder), these schemes are all embodiments of a technique in which a method of operation of a data decoding apparatus comprises the data decoding apparatus decoding input encoded data values encoded as data sets and escape codes for values not encoded by the data sets, an escape code comprising a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

Embodiments encompass an encoding and/or decoding apparatus carrying out such methods, software by which such methods are caused to be carried out by a computer running such software, a non-transitory machine-readable storage medium by which such software is provided (such as a magnetic or optical disk), and video data capture, transmission, display and/or storage apparatus comprising such apparatus.

As discussed, the prefix portion may comprise a unary encoded value.

In some embodiments, a mapping can be used when extended precision processing is enabled that can be used to limit the number of prefix bits required to signal the worst case. Such a mapping is presented in the following table which maps suffix lengths to prefix lengths for extended precision processing.

| | Prefix Length | | | | | | | |
|---|---|---|---|---|---|---|---|---|
| | 0 | 1 | 2 | 3 | 4 | 5 | 6 | 7 |
| Suffix length (i) | 0 | 1 | 2 | 3 | 4 | 5 | 6 | 7 ... |
| Suffix length (ii) | 0 | 1 | 2 | 4 | 8 | | | maxTrDynamicRange |
| Suffix length (iii) | 0 | 1 | 2 | 3 | 4 | 6 | 10 | maxTrDynamicRange - rParam |

Scheme (i) replicates the behaviour of normal exponential-Golomb coding.

Scheme (ii) emulates the suffix length being an exponential function of the prefix length as discussed above.

It can be noted that scheme (ii) can reduce the worst case for 16-bit video coding (where MAX_TR_DYNAMIC_RANGE is 22-bits) from 46 bits (scheme i with unary coding) to 31 bits if unary coding is used for the prefix, or 30 bits if truncated unary coding is used for the prefix, with the maximum of 5 prefix bits, though this results in a larger loss of coding efficiency than scheme (iii) as interval precision is lost for small values. However, if the Golomb-Rice parameter adaptation methods disclosed in GB1320775.8 (the contents of which are incorporated by reference) are also adopted, the losses for these schemes can be reduced.

Using scheme (iii), the fine-grained coding intervals for small values are maintained, while requiring no more than 7 prefix bits (rather than 21) to signal the largest possible suffix. In addition, since the maximum prefix length is known, the prefix can be coded using truncated-unary coding as a truncated unary encoded value—omitting the separator if the maximum prefix length is reached. The maximum suffix length if maxTrDynamicRange, although when rParam is non 0, the maximum suffix length is maxTrDynamicRange−rParam, with a further rParam bits following the suffix. Hence in some embodiments of this scheme, some or all of the values in the table are a function of rParam.

The controller 345 may be configured so as to access one or more of a set of tables (such as the tables (i) to (iii) above) to detect an appropriate relationship between prefix length and suffix length.

The worst case escape code length is hence reduced to 7 (prefix)+22 (maximum suffix)+3 (not-a-Golomb-Rice-code bits)=32, noting that there is no separator for the truncated unary prefix, allowing any escape code to fit into a single 32-bit integer.

Further features of some embodiments are as follows:

Since the maximum suffix length is known, the prefix could be sent using truncated-unary coding instead of simple unary coding (that is to say, if the maximum number of prefix bits is reached, the separator normally provided between the prefix and suffix is not needed).

In schemes where a prefix length may map to a suffix length larger than needed (for example, larger than maxTrDynamicRange), instead it can be clipped to this value, so that any values provided by the relationship between prefix length and suffix length which are greater than maxTrDynamicRange are set to equal maxTrDynamicRange. In general, in embodiments, the relationship between the value encoded by the prefix portion and the length of the non-unary coded suffix portion is such that the maximum length of the non-unary coded suffix portion is no greater than the maximum number of bits of each of the data values to be encoded.

In configurations where maxTrDynamicRange is less than 16 bits, the value of 16 can be removed, for example by setting the maximum suffix length in the above relationships as 15. As an example, this might be used for interpreting the exponential prefix of value 4, which would otherwise imply a 16 bit suffix.

A first worked example will now be discussed.

Input to this process is a request for a table-based binarization for a syntax element with unsigned value synVal, the Rice parameter riceParam and a flag isChroma indicating whether or not the current syntax element relates to a chroma coefficient.

Output of this process is the table-based binarization of the syntax element synVal.

The variable maxTrDynamicRange is derived as follows:

If isChroma is equal to 0, then maxTrDynamicRange extended_precision_processing_flag? Max(15, BitDepthY+6): 15

Otherwise,
maxTrDynamicRange=extended_precision_processing_flag? Max (15, BitDepthC+6): 15

The notation used here is as follows. "A=flag? B: C" indicates that variable A is assigned to value B or value C depending on the state of a binary value "flag" being true or false respectively. Max (D, E) returns the greater of the values D and E. BitDepthY is the luma or green channel bit depth; BitDepthC is the chroma or blue and red channel bit depth. The value extended_precision_processing_flag is a flag indicating whether extended precision processing is enabled or not.

The variables suffixLength[x] and minimumUncodeableValue[x], a value indicating the minimum value of an escape-escape code as discussed above, are derived from the following table (as an example):

| X | 0 | 1 | 2 | 3 | 4 | 5 | 6 | 7 |
|---|---|---|---|---|---|---|---|---|
| suffixLength[x] | 0 | 1 | 2 | 3 | 4 | 6 | 10 | maxTrDynamicRange − riceParam |
| minimumUncodeableValue[x] | 1 | 3 | 7 | 15 | 31 | 95 | 1119 | — |

The bin string of the table-based binarization process of a syntax element synVal is specified as follows, where each call of the function put(X), with X being equal to 0 or 1, adds the binary value X at the end of the bin string:

```
suffix = synVal >> riceParam
prefixLength = 0
while( (prefixLength < 7) && (suffix >=
   minimumUncodeableValue[prefixLength]) )
{
   prefixLength++
   put(1)
}
put ((prefixLength == 7) ? 1 : 0)
if (prefixLength > 0)
{
   synVal −= minimumUncodeableValue[prefixLength − 1] <<
      riceParam
}
totalSuffixLength = suffixLength[prefixLength] + riceParam
while ((totalSuffixLength −−) > 0)
{
   put((synVal >> totalSuffixLength) & 1)
}
```

Binarization Process for Coeff_Abs_Level_Remaining

The variable cMax is derived from cRiceParam, which is equivalent to rParam used above, as:
cMax=43<<cRiceParam The binarization of the syntax element coeff_abs_level_remaining[n] is a concatenation of a prefix bin string and (when present) a suffix bin string.

For the derivation of the prefix bin string, the following applies:

The prefix value of cu_qp_delta_abs, prefixVal, is derived as follows:
prefixVal=Min(cMax, coeff_abs_level_remaining[n])

The prefix bin string is specified by invoking the TR binarization process for prefixVal with the variables cMax and cRiceParam as inputs.

When the prefix bin string is equal to the bit string of length 43 with all bits equal to 1, the suffix bin string is present and it is derived as follows:

The suffix value of cu_qp_delta_abs, suffixVal, is derived as follows:
suffixVal=coeff_abs_level_remaining[n]−cMax When extended_precision_processing_flag is equal to 1, the suffix bin string is specified by invoking a table-based binarization process for suffixVal with the variable isChroma set equal to 1 if cIdx is greater than 0 and 0 otherwise.

Otherwise (extended_precision_processing_flag is equal to 0), the suffix bin string is specified by invoking an EGk binarization process for suffixVal with the Exp-Golomb order k set equal to cRiceParam.

A further worked example, relating to embodiments in which the prefix length is capped, will now be described. Input to this process is a request for a limited exponential-Golomb binarization for a syntax element with unsigned value synVal, the Rice parameter riceParam and a flag isChroma indicating whether or not the current syntax element relates to a chroma coefficient. Output of this process is the limited exponential-Golomb-order-k binarization of the syntax element synVal.

The variable maxTrDynamicRange is derived as follows:

If isChroma is equal to 0, maxTrDynamicRange extended_precision_processing_flag? Max(15, BitDepth$_Y$+6): 15

Otherwise,
maxTrDynamicRange=extended_precision_processing_flag? Max(15, BitDepth$_C$+6): 15

The variable maximumPrefixLength is set equal to (29−maxTrDynamicRange). The bin string of the limited exponential-Golomb-order-k binarization process of a syntax element synVal is specified as follows, where each call of the function put(X), with X being equal to 0 or 1, adds the binary value X at the end of the bin string:

```
codeValue = synVal >> riceParam
prefixLength = 0
while( (prefixLength < maximumPrefixLength) && (codeValue > ( (2 << prefixLength) −2) ) )
{
    prefixLength++
    put(1)
}
if (prefixLength = = maximumPrefixLength)
{
    totalSuffixLength = maxTrDynamicRange
    put(1)
}
else
{
    totalSuffixLength = prefixLength + riceParam
    put(0)
}
synVal = synVal − ( ( (1 << prefixLength) − 1) << riceParam)
while ( (totalSuffixLength −−) > 0)
{
    put( (synVal >> totalSuffixLength) & 1)
}
```

In a normal exponential-Golomb code, as discussed above, the suffix is formed by subtracting the minimum value that could not be coded by a smaller suffix length from the value to be coded. For example, to code 9 (0b1001) (the 0b prefix denotes a binary representation) with k=0 (or without applying k), note that:

0-bit prefix/suffix codes up to value 0

1-bit prefix/suffix codes up to value 2

2-bit prefix/suffix codes up to value 6

Hence a 3-bit prefix/suffix (codes up to value 14) is needed. The smallest value that could not be coded with a 2-bit prefix/suffix is 7 (6+1)—so the suffix is formed as 9−7=2 (0b010) as 3 bits, making the final coded value 111-0-010.

Under the present disclosure, the suffix length associated with the maximum prefix length is (necessarily) large enough that this subtraction is not needed—so the suffix could simply be equal to the value to be coded.

For example, maximum prefix length=3, associated suffix length=4

A coded value is then equal to a truncated-unary prefix followed by a suffix equal to the value to be coded. For example, decimal 9 could be coded as 111-1001

In a further worked example, the number of 1s used to signal "not a Golomb-Rice code" is 4, but the code is then interpreted as a (k+1)th order exponential Golomb code. The maximum prefix length for the techniques discussed above is derived as:

$maximumPrefixLength = 32$ (the desired maximum code length) −

(number of bits to signal "not a Golomb-Rice code") −

$maxTrDynamicRange = 28 − maxTrDynamicRange$

Consider the following codes:

(i) 110X . . .

(ii) 1110X . . .

(iii) 111X . . .

(where X indicates "don't care what the value of this bit is")

In the code (i), where the number of leading 1s is equal to 2, neither of the above arrangements will interpret this as an exponential-Golomb code.

In the code (ii), where the number of leading 1s is equal to 3, the system described first above will interpret theis as an exponential-Golomb code, whereas the second arrangement will not. However, since there are exactly 3 leading 1s, the prefix length of the exponential-Golomb code is 0 (there are no 1s before the first 0). But when the prefix length is 0, the interpretation of a kth order exponential-Golomb code is the same as the interpretation of a kth-order Golomb-Rice code.

In the code (iii), where the number of leading 1s is 4, both techniques will interpret this as an exponential-Golomb code. In the first system, this will be interpreted as a kth-order code with a prefix length of at least 1. In the second system, this will be interpreted as a (k+1)th order code with a prefix length of at least 0. In both cases, the prefix length depends on the number of additional 1s following the beginning of this code. But since in exponential-Golomb coding prefix bits effectively add to the value of k, it can be see that both interpretations are equivalent. It is therefore equivalent to raise the "not a Golomb-Rice code" threshold by (no more than) 1 provided the value of k when decoding an exponential-Golomb code is also increased by 1.

Figure 19:
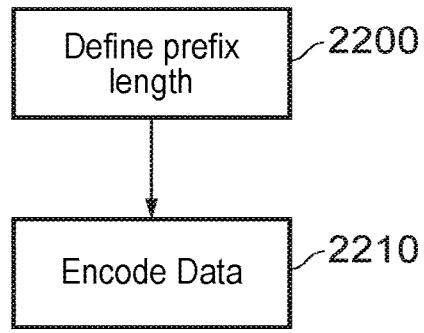
FIG. 19 is a schematic flowchart illustrating a coding technique.
Figure 20:
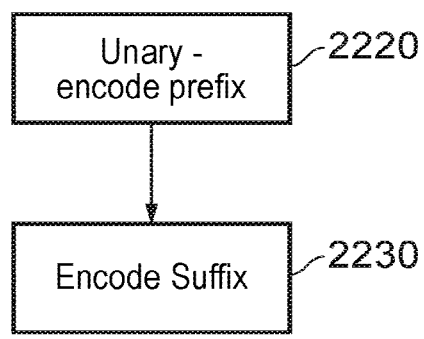
FIG. 20 is a schematic flowchart illustrating a coding technique.

FIG. 19 is a schematic flowchart illustrating a coding technique. At a step 2200, a prefix length and/or a maximum prefix length is defined (for example, by the controller 345, in response to one or more parameters such as data bit depth) by any one of the techniques discussed above. At a step 2210, one or more data values are encoded according to the prefix length so defined, FIG. 20 is a schematic flowchart illustrating a coding technique. At a step 2220, a prefix is encoded as a unary encoded value (an example being a truncated unary encoded value). At a step 2230 a corresponding suffix is encoded.

Figure 21:
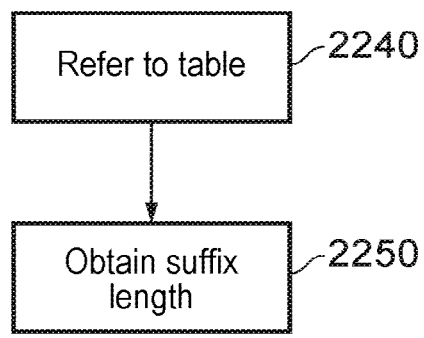
FIG. 21 is a schematic flowchart illustrating a coding technique.

FIG. 21 is a schematic flowchart illustrating a coding technique. At a step 2240, reference is made to a table as discussed above, to obtain (at a step 2250) a suffix length.

Corresponding techniques apply to the respective decoding stages.

Further respective aspects and features of the present disclosure are defined by the following numbered clauses:

1. A method of operation of a data encoding apparatus, the method comprising:

the data encoding apparatus encoding an array of data values as data sets and escape codes for values not encoded by the data sets, an escape code comprising a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

2. A method according to clause 1, in which the prefix portion comprises a unary encoded value.

3. A method according to clause 2, in which the prefix portion comprises a truncated unary encoded value.

4. A method according to any one of the preceding clauses, where the relationship between the length of the prefix portion and the length of the suffix portion is defined by information sent in association with the data to be coded.

5. A method according to any one of the preceding clauses, in which the value encoded by the prefix portion and the length of the non-unary coded suffix portion are associated by one or more tables.

6. A method according to clause 5, comprising the step of selecting one of the tables associating the value encoded by the prefix portion and the length of the non-unary coded suffix portion according to one or more of the group consisting of: (i) a data flag associated with the encoded data values; and (ii) a parameter derived from one or more previously encoded data values.

7. A method according to any one of the preceding clauses, in which the value encoded by the prefix portion is associated with the length of the non-unary coded suffix portion such that the length of the non-unary coded suffix portion is an exponential function of the value encoded by the prefix portion.

8. A method according to any one of the preceding clauses, in which the relationship between the value encoded by the prefix portion and the length of the non-unary coded suffix portion is such that the maximum length of the non-unary coded suffix portion is no greater than a maximum value selected from the list consisting of: the maximum number of bits of each of the data values to be encoded; and a predetermined maximum value.

9. A method according to any one of the preceding clauses, in which the prefix portion is itself encoded as an exponential Golomb code.

10. A method according to any one of the preceding clauses, in which the prefix length is capped at a maximum prefix length value.

11. A method according to clause 10, in which the maximum prefix length value is dependent upon a value maxTrDynamicRange, being the dynamic range of the data values for encoding.

12. A method according to clause 11, in which the maximum prefix length is equal to 29-maxTrDynamicRange.

13. A method according to any one of the preceding clauses, in which one of the data sets is a significance map indicative of positions, relative to an array of the data values, of most-significant data portions which are non-zero.

14. A method according to clause 13, in which the significance map comprises a data flag indicative of the position, according to a predetermined ordering of the array of data values, of the last of the most-significant data portions having a non-zero value.

15. A method according to clause 13, in which the data sets comprise:
a greater-than-one map indicative of positions, relative to the array of the data values, of most-significant data portions which are greater than 1; and
a greater-than-two map indicative of positions, relative to the array of the data values, of most-significant data portions which are greater than 2.

16. A method of operation of a data decoding apparatus, comprising:
the data decoding apparatus decoding input encoded data values encoded as data sets and escape codes for values not encoded by the data sets, an escape code comprising a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

17. Computer software which, when executed by a computer, causes the computer to carry out the method of any one of the preceding clauses.

18. A data encoding apparatus comprising:
an encoder configured to encode an array of data values as data sets and escape codes for values not encoded by the data sets, an escape code comprising a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

19. A data decoding apparatus comprising:
a decoder configured to decode input encoded data values encoded as data sets and escape codes for values not encoded by the data sets, an escape code comprising a prefix portion and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

20. Video data capture, transmission, display and/or storage apparatus comprising apparatus according to clause 18 or claim 19.

Further respective aspects and features of the present disclosure are defined by the following numbered clauses:

1. A data decoding apparatus comprising:
a decoder configured to decode input encoded data values into decoded data values having a bit depth, the input encoded data values being encoded as data sets and escape codes for values not encoded by the data sets, an escape code comprising a prefix portion having a prefix length capped at a maximum prefix length dependent upon the bit depth of the data values and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

2. Apparatus according to clause 1, in which the prefix portion comprises a unary encoded value.

3. Apparatus according to clause 2, in which the prefix portion comprises a truncated unary encoded value.

4. Apparatus according to any one of clauses 1 to 3, comprising a controller configured to access one or more tables in which the value encoded by the prefix portion and the length of the non-unary coded suffix portion are associated.

5. Apparatus according to clause 4, in which the controller is configured to select one of the tables associating the value encoded by the prefix portion and the length of the non-unary coded suffix portion according to one or more of the group consisting of: (i) a data flag associated with the encoded data values; and (ii) a parameter derived from one or more previously encoded data values.

6. Apparatus according to any one of clauses 1 to 3, in which the value encoded by the prefix portion is associated with the length of the non-unary coded suffix portion such that the length of the non-unary coded suffix portion is an exponential function of the value encoded by the prefix portion.

7. Apparatus according to any one of clauses 1 to 3, in which the relationship between the value encoded by the prefix portion and the length of the non-unary coded suffix portion is such that the maximum length of the non-unary coded suffix portion is no greater than a maximum value selected from the list consisting of: the maximum number of bits of each of the data values to be encoded; and a predetermined maximum value.

8. Apparatus according to any one of the preceding clauses, in which the prefix portion is itself encoded as an exponential Golomb code.

9. Apparatus according to any one of the preceding clauses, in which the prefix length is capped at a maximum prefix length dependent upon the bit depth of the data values plus six.

10. Apparatus according to any one of the preceding clauses, in which the maximum prefix length is equal to a predetermined constant minus a value equal to the dynamic range of the data values for encoding.

11. Apparatus according to clause 10, in which the predetermined constant is equal to 29.

12. Apparatus according to clause 10, in which the predetermined constant is equal to 28.

13. Apparatus according to any one of the preceding clauses, in which one of the data sets is a significance map indicative of positions, relative to an array of the data values, of most-significant data portions which are non-zero.

14. Apparatus according to clause 13, in which the significance map comprises a data flag indicative of the position, according to a predetermined ordering of the array of data values, of the last of the most-significant data portions having a non-zero value.

15. A method of operation of a data decoding apparatus, comprising:

the data decoding apparatus decoding input encoded data values into decoded data values having a bit depth, the input encoded data values being encoded as data sets and escape codes for values not encoded by the data sets, an escape code comprising a prefix portion having a prefix length capped at a maximum prefix length dependent upon the bit depth of the data values and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

16. Computer software which, when executed by a computer, causes the computer to carry out the method of clause 15.

17. A non-transitory machine-readable storage medium which stores computer software according to clause 16.

18. A data encoding apparatus comprising:

an encoder configured to encode an array of data values having a bit depth as data sets and escape codes for values not encoded by the data sets, an escape code comprising a prefix portion having a prefix length capped at a maximum prefix length dependent upon the bit depth of the data values and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

19. Apparatus according to clause 18, in which the prefix portion comprises a unary encoded value.

20. Apparatus according to clause 19, in which the prefix portion comprises a truncated unary encoded value.

21. Apparatus according to any one of clauses 18 to 20, comprising a controller configured to access one or more tables in which the value encoded by the prefix portion and the length of the non-unary coded suffix portion are associated.

22. Apparatus according to clause 21, in which the controller is configured to select one of the tables associating the value encoded by the prefix portion and the length of the non-unary coded suffix portion according to one or more of the group consisting of: (i) a data flag associated with the encoded data values; and (ii) a parameter derived from one or more previously encoded data values.

23. Apparatus according to any one of clauses 18 to 20, in which the value encoded by the prefix portion is associated with the length of the non-unary coded suffix portion such that the length of the non-unary coded suffix portion is an exponential function of the value encoded by the prefix portion.

24. Apparatus according to any one of clauses 18 to 20, in which the relationship between the value encoded by the prefix portion and the length of the non-unary coded suffix portion is such that the maximum length of the non-unary coded suffix portion is no greater than a maximum value selected from the list consisting of: the maximum number of bits of each of the data values to be encoded; and a predetermined maximum value.

25. Apparatus according to any one of clauses 18 to 24, in which the prefix portion is itself encoded as an exponential Golomb code.

26. Apparatus according to any one of clauses 18 to 25, in which the maximum prefix length is equal to a predetermined constant minus a value equal to the dynamic range of the data values for encoding.

27. Apparatus according to clause 26, in which the predetermined constant is equal to 29.

28. Apparatus according to clause 26, in which the predetermined constant is equal to 28.

29. Apparatus according to any one of clauses 18 to 28, in which one of the data sets is a significance map indicative of positions, relative to an array of the data values, of most-significant data portions which are non-zero.

30. Apparatus according to clause 29, in which the significance map comprises a data flag indicative of the position, according to a predetermined ordering of the array of data values, of the last of the most-significant data portions having a non-zero value.

31. Apparatus according to clause 29 or claim 30, in which the data sets comprise:

a greater-than-one map indicative of positions, relative to the array of the data values, of most-significant data portions which are greater than 1; and a greater-than-two map indicative of positions, relative to the array of the data values, of most-significant data portions which are greater than 2.

32. A method of operation of a data encoding apparatus, the method comprising:

the data encoding apparatus encoding an array of data values as data sets having a bit depth and escape codes for values not encoded by the data sets, an escape code comprising a prefix portion having a prefix length capped at a maximum prefix length dependent upon the bit depth of the data values and a non-unary coded suffix portion having a length, in bits, dependent upon a value encoded by the prefix portion according to a relationship such that, for at least some values encoded by the prefix portion, the length of the non-unary coded suffix portion is greater than the length, in bits, of the prefix portion.

33. Computer software which, when executed by a computer, causes the computer to carry out the method of clause 32.

34. A non-transitory machine-readable storage medium which stores computer software according to clause 33.

35. Video data capture, transmission, display and/or storage apparatus comprising apparatus according to any one of clauses 1 to 14 and 18 to 31.

It will be appreciated that functions of a decoder or an encoder, or functional steps of a decoding method or an encoding method, to select or otherwise establish a relationship between prefix length and suffix length, and/or to select or otherwise establish a maximum prefix length, may be carried out by a controller or the like, such as (in some examples described above) the controller 345.

As discussed earlier, it will be appreciated that apparatus features of the above clause may be implemented by respective features of the encoder or decoder as discussed earlier.

The invention claimed is:

1. A method of encoding video data comprising:
    encoding a video coding parameter representing a value of a syntax element to encode by an exponential Golomb encoding scheme selected from amongst a set of encoding schemes; and
    limiting a length in bits to which the value of the syntax element representing the video coding parameter is encoded by the exponential Golomb encoding scheme to 32 bits by
        calculating, via circuitry, a maximum length of a prefix portion based on a bit depth of data values to be encoded plus six, and
        allocating, via the circuitry, bits to the prefix portion and to a suffix portion, a length in bits of the suffix portion being dependent on a value encoded by the prefix portion.

2. The method as claimed in claim 1, wherein the prefix portion comprises a unary encoded portion.

3. The method as claimed in claim 2, wherein the prefix portion comprises a truncated unary encoded value.

4. The method as claimed in claim 1, wherein the suffix portion comprises a non-unary encoded value.

5. The method as claimed in claim 4, wherein a length of the non-unary encoded value is an exponential function of the value encoded by the prefix portion.

6. The method as claimed in claim 1, wherein the maximum length of the prefix portion is equal to a constant minus a value equal to a dynamic range of data values to be encoded.

7. A method of decoding the video data encoded by the method of claim 1.

8. A non-transitory machine-readable storage medium which stores software which, when executed by a computer, causes the computer to carry out the method of claim 1.

9. A video data encoder apparatus comprising:
    circuitry configured to:
    encode a video coding parameter representing a value of a syntax element to encode by an exponential Golomb encoding scheme selected from amongst a set of encoding schemes; and
    limit a length in bits to which the value of the syntax element representing the video coding parameter is encoded by the exponential Golomb encoding scheme to 32 bits by
        calculating a maximum length of a prefix portion based on a bit depth of data values to be encoded plus six, and
        allocating bits to the prefix portion and to a suffix portion, a length in bits of the suffix portion being dependent on a value encoded by the prefix portion.

10. The video data encoder as claimed in claim 9, wherein the prefix portion comprises a unary encoded portion.

11. The video data encoder as claimed in claim 10, wherein the prefix portion comprises a truncated unary encoded value.

12. The video data encoder as claimed in claim 9, wherein the suffix portion comprises a non-unary encoded value.

13. The video data encoder as claimed in claim 12, wherein a length of the non-unary encoded value is an exponential function of the value encoded by the prefix portion.

14. The video data encoder as claimed in claim 9, wherein the maximum length of the prefix portion is equal to a constant minus a value equal to a dynamic range of data values to be encoded.

15. A video data capture, transmission, display and/or storage apparatus comprising the video data encoder apparatus as claimed in claim 9.

16. A video data decoder comprising:
    circuitry configured to decode video data having been encoded by
        encoding a video coding parameter representing a value of a syntax element to encode by an exponential Golomb encoding scheme selected from amongst a set of encoding schemes; and
        limiting a length in bits to which the value of the syntax element representing the video coding parameter is encoded by the exponential Golomb encoding scheme to 32 bits by
            calculating a maximum length of a prefix portion based on a bit depth of data values to be encoded plus six, and
            allocating bits to the prefix portion and to a suffix portion, a length in bits of the suffix portion being dependent on a value encoded by the prefix portion.

17. The video data decoder as claimed in claim 16, wherein the maximum length of the prefix portion is equal to a constant minus a value equal to a dynamic range of data values to be encoded.

* * * * *